(12) United States Patent
Kanj et al.

(10) Patent No.: US 11,702,583 B2
(45) Date of Patent: *Jul. 18, 2023

(54) COMPOSITIONS AND METHODS EMPLOYING CARBON-BASED NANODOTS FOR WETTABILITY ALTERATION

(71) Applicants: Saudi Arabian Oil Company, Dhahran (SA); King Fahd University of Petroleum and Minerals, Dhahran (SA)

(72) Inventors: Mazen Kanj, Dhahran (SA); Sivabalan Sakthivel, Dhahran (SA)

(73) Assignees: Saudi Arabian Oil Company, Dhahran (SA); King Fahd University of Petroleum and Minerals, Dhahran (SA)

(*) Notice: Subject to any disclaimer, the term of this patent is extended or adjusted under 35 U.S.C. 154(b) by 244 days.

This patent is subject to a terminal disclaimer.

(21) Appl. No.: 17/145,812

(22) Filed: Jan. 11, 2021

(65) Prior Publication Data

US 2021/0371724 A1    Dec. 2, 2021

Related U.S. Application Data

(60) Provisional application No. 63/029,968, filed on May 26, 2020, provisional application No. 63/029,965, filed on May 26, 2020.

(51) Int. Cl.
*C09K 8/584* (2006.01)
*E21B 43/17* (2006.01)
(Continued)

(52) U.S. Cl.
CPC .............. *C09K 8/584* (2013.01); *C01B 32/15* (2017.08); *C09K 8/58* (2013.01); *E21B 43/16* (2013.01);
(Continued)

(58) Field of Classification Search
None
See application file for complete search history.

(56) References Cited

U.S. PATENT DOCUMENTS 8,946,132 B2    2/2015    Chang et al.
9,447,682 B2    9/2016    Kanj et al.
(Continued)

FOREIGN PATENT DOCUMENTS

CN    105789448 A    7/2016
WO    2018232076 A1    12/2018

OTHER PUBLICATIONS

U.S. Office Action dated Oct. 14, 2021 pertaining to U.S. Appl. No. 17/176,469, filed Feb. 16, 2021, 27 pages.
(Continued)

*Primary Examiner* — John J Figueroa
(74) *Attorney, Agent, or Firm* — Dinsmore & Shohl LLP

(57) ABSTRACT

A method for modifying surface wettability of a surface of a solid substrate may include contacting the surface of the solid substrate with a brine solution containing carbon nanodots. The carbon nanodots may have carbon, oxygen, nitrogen, and hydrogen as constituent elements and may include one or more functional groups disposed at outer surfaces of the carbon nanodots. The brine solution has a salinity of greater than 30,000 TDS. A concentration of carbon nanodots in the brine solution is less than or equal to 500 ppmw. Contacting the solid substrate with the brine solution comprising the carbon nanodots is characterized by a contact duration, a contact volume, or both, that is sufficient to reduce the oil wettability of the surface of the solid substrate by at least 15%, as defined by a contact angle of a crude oil droplet contacted with the surface of the solid substrate.

20 Claims, 10 Drawing Sheets

(51) Int. Cl.
  *C01B 32/15*  (2017.01)
  *C09K 8/58*  (2006.01)
  *E21B 43/16*  (2006.01)
  *B82Y 30/00*  (2011.01)
  *B82Y 40/00*  (2011.01)

(52) U.S. Cl.
  CPC .............. *E21B 43/17* (2013.01); *B82Y 30/00* (2013.01); *B82Y 40/00* (2013.01); *C01P 2004/32* (2013.01); *C01P 2004/64* (2013.01); *C01P 2006/14* (2013.01); *C09K 2208/10* (2013.01); *C09K 2208/28* (2013.01)

(56) References Cited

U.S. PATENT DOCUMENTS

| | | | |
|---|---|---|---|
| 9,453,159 | B2 | 9/2016 | Kanj et al. |
| 9,464,034 | B2 | 10/2016 | Kanj et al. |
| 9,469,599 | B2 | 10/2016 | Kanj et al. |
| 9,528,045 | B2 | 12/2016 | Kanj et al. |
| 9,580,639 | B2 | 2/2017 | Chang et al. |
| 9,715,036 | B2 | 7/2017 | Murugesan et al. |
| 9,725,640 | B2 | 8/2017 | Tang et al. |
| 10,047,283 | B2 | 8/2018 | Kang et al. |
| 10,053,974 | B2 | 8/2018 | Murugesan et al. |
| 10,119,072 | B2 | 11/2018 | Kanj et al. |
| 10,155,899 | B2 * | 12/2018 | Agrawal .................. C09K 8/58 |
| 10,508,227 | B2 | 12/2019 | Chang et al. |
| 10,647,909 | B2 * | 5/2020 | Li .......................... C09K 8/685 |
| 11,352,549 | B2 * | 6/2022 | Kanj ........................ E21B 43/16 |
| 2014/0031265 | A1 | 1/2014 | Chang et al. |
| 2016/0289539 | A1 | 10/2016 | Jangda et al. |
| 2017/0022804 | A1 | 1/2017 | Gupta et al. |
| 2018/0327652 | A1 | 11/2018 | Kuznetsov et al. |
| 2019/0048251 | A1 * | 2/2019 | Agrawal .................. E21B 43/20 |
| 2019/0345377 | A1 | 11/2019 | Haque et al. |

OTHER PUBLICATIONS

U.S. Notice of Allowance dated Feb. 2, 2022 pertaining to U.S. Appl. No. 17/176,469, filed Feb. 16, 2021, 5 pages.

Aslan et al., "Non-monotonicity of Contact Angle from NaCl and MgCl2 Concentrations in two Petroleum Fluids on Atomistically Smooth Surfaces", Energy & Fuels, ACS Paragon Plus Environment, DOI: 10.1021/acs.energyfuels.6b00175, Mar. 21, 2016.

Hussain, et al., "Effect of the number of ethylene oxide units on the properties of synthesized tailor-made cationic gemini surfactants for oilfield applications", Journal of Molecular Structure, vol. 1196, pp. 851-860, 2019.

Kanj et al., "Industry First Field Trial of Reservoir Nanoagents", Society of Petroleum Engineers, SPE 142592, 10 pages, 2011.

Kanj et al., "Oil Industry First Field Trial of Inter-Well Reservoir Nanoagent Tracers", Proc. of SPIE, vol. 9467, 94671D-1, 2015.

Li et al., "A Novel Nanofluid Based on Fluorescent Carbon Nanoparticles for Enhanced Oil Recovery", Industrial & Engineering Chemistry Research, vol. 56, pp. 12464-12470, 2017.

Wang et al., "Investigation of the Effect of Temperature and Pressure on Wettability Using Modified Pendant Drop Method", Society of Petroleum Engineers, SPE 30544, pp. 117-126, 1995.

Wasan et al., "Spreading of nanofluids on solids", Nature, vol. 423, pp. 156-159, 2003.

Fang et al., "Easy Synthesis and Imaging Applications of Cross-Linked Green Fluorescent Hollow Carbon Nanoparticles", ACS Nano, vol. 6, No. 1, pp. 400-409, 2012.

Jarrahian et al., "Wettability alteration of carbonate rocks by surfactants: A mechanistic study", Colloids and Surfaces A: Physicochem. Eng. Aspects, vol. 410, pp. 1-10, 2012.

Ryssmann et al., "Formation Mechanism of Carbogenic Nanoparticles with Dual Photoluminescence Emission", Journal of the American Chemical Society, vol. 134, pp. 747-750, 2012.

Prieve et al., "Diffusiophoresis of charged colloidal particles in the limit of very high salinity", pnas, vol. 116, No. 37, pp. 18257-18262, Sep. 10, 2019.

Sakthivel et al., "Experimental Evaluation of Carbon Dots Stabilized Foam for Enhanced Oil Recovery", Energy & Fuels, vol. 33, No. 10, pp. 9629-9643, 2019.

* cited by examiner

COMPOSITIONS AND METHODS EMPLOYING CARBON-BASED NANODOTS FOR WETTABILITY ALTERATION

CROSS-REFERENCE TO RELATED APPLICATIONS

This application claims the benefit of priority under 35 U.S.C. § 120 of U.S. Provisional Patent Application Ser. No. 63/029,968, filed May 26, 2020, and U.S. Provisional Patent Application Ser. No. 63/029,965, filed May 26, 2020, the entire contents of both of which are incorporated by reference in the present disclosure.

TECHNICAL FIELD

The present disclosure generally relates to systems and methods for using carbon-based nanodots, and more specifically, systems and methods for using carbon-based nanodots to modify surface wettability of solid substrates and for enhanced oil recovery of hydrocarbons from subterranean formations using the carbon-based nanodots.

BACKGROUND

Changing the wetting state of materials is a growing field of research in many areas of engineering and science with enormous practical applications. Wettability of surfaces may be preferred to be hydrophilic or hydrophobic depending on the type of the application. Change of surface wettability of surfaces can be achieved using different techniques such as increasing the roughness of these surfaces to become more hydrophobic or coating these surfaces with low surface energy materials (such as wax to render them super-hydrophobic) to support resist rust/corrosion formation. Typically, surfactant-based wetting agents are used to modify wettability, so that most of the cleaning fluids used in subterranean resource well drilling are formulated with surfactants. However, these conventional cleaning fluids fail to alter the wettability in harsh environments, such as environments including high temperature, high pressure, and high salinity conditions.

In subterranean resource well drilling, primary oil recovery methods contribute to recovery of only about 15% of the crude oil in the reservoir. Secondary recovery methods, such as water flooding, can produce an additional 30% of the original oil in place (OOIP) in the reservoir. This means that more than 60% of the oil remains entrapped in the subterranean formation, which may require some form of improved or enhanced oil recovery (IOR or EOR) techniques to further increase recovery of hydrocarbons from the subterranean formation.

Chemical enhanced oil recovery (CEOR) is most useful and successful in small field pilot applications. The norm in conventional CEOR is to undertake field pilots with 5 or 7 wells that are tens of meters apart (about 50 meters to 100 meters of well-to-well spacing). The size of such a pilot well arrangement fades by comparison to the scale of operation and requirements in large prolific oilfields, such as in Saudi Arabia for example. The current practice in the large prolific oilfields of the world is to perform peripheral water injections targeting pressure maintenance and conducting a slow water drive mechanism to sustain the health and productivity of the field on the long run. Large prolific oilfields can be tens or even hundreds of kilometers in outer surface dimension. Injection wells are positioned outside the oilfield in the flanks of the reservoir and only production wells or observation wells are drilled inside the oilfield. Wells are drilled roughly at a one kilometer distance from each other. The CEOR challenge is caused by the adsorption and diffusion of molecular surfactants and other chemicals in the porous media of the subterranean formation. Typical oilfield chemicals, such as surfactants and polymers, work well in breaking and mobilizing the oil in the near wellbore region but lose the bulk of their mass in the process. The loss of mass of these chemicals due to adsorption into the porous media of the formation make these conventional oilfield chemicals unable to reach the deeper regions of the reservoir. In addition, the common trend is to use it in large concentrations (nearing and exceeding 1% wt/v). This makes it highly uneconomical and impractical for field use and application. Conventional oilfield additive agents for enhanced oil chemical EOR, such surfactant, polymer, or possibly other nanoparticles, are prone to adsorption, diffusion and used in much higher concentrations which limit its use to pilots with wells that are tens of meters apart (50-100 m). This is not practical for the arrangements of current wells of Saudi Arabia and other large prolific oilfields, in particular, where wells can be spaced at more than 1,000 meters apart on average and injection wells are only drilled in the flanks of the reservoirs.

SUMMARY

In the oil and gas industry, there is an ongoing need for inexpensive carbon-based nanoparticles that are capable of modifying the surface wettability of surfaces of solid substrates at high temperature, high pressures, and high salinity conditions. Ongoing needs also exist for methods for enhanced oil recovery to improve recovery of hydrocarbons, such as crude oil, from hydrocarbon bearing subterranean formations, in particular, deep reservoir regions and regions having extreme reservoir conditions such as but not limited to high temperatures up to 250 degrees Celsius (° C.), high pressures (up to 6,000 pounds per square inch (psi), and high salinity (up to 240,000 parts per million by weight Total Dissolved Solids).

Embodiments of the present disclose relate to systems and methods for using carbon-based nanodots (carbon nanodots) to alter surface wettability of solid substrates at high temperature, high pressure, and high salinity conditions. More specially, embodiments of the present disclosure present systems and methods for using carbon nanodots with the capability to alter wettability of solid substrates in very low concentrations of the nanodots, for example, concentrations of less than 500 parts per million by weight (ppmw), such as but not limited to 10 ppmw to 100 ppmw. The present disclosure finds the carbon nanodots to be highly stable under harsh reservoir conditions, very easy and cheap to synthesize, and scalable for industrial production and use. These aspects of the carbon nanodots make them well-suited for oilfield applications. The systems and methods of the present disclosure may be used to alter wettability of carbonate rock, sandstone rocks, and other types of substrates, such as but not limited to porous metals, solid metals, polymers, or glass.

In the oilfield industry, understanding formation wettability is crucial for optimizing oil recovery. Wettability can be described as the comparative adhesion force of two different immiscible fluids on a solid surface. The present disclosure contemplates that the knowledge of the reservoir's wettability may be used to predict the production efficiency, also based on the quantitative estimation of water, oil, gases that are present in the reservoir will also vary.

The present disclosure relates to organic carbon nanodots for wettability alteration experiments. The carbon nanodots are used in very low to trace amounts such as concentrations that are less than 500 ppmw, less than 100 ppmw, and even down to about 10 ppmw (0.001 wt/v %). The carbon nanodots may be inexpensive and may have an average particle size of less than 10 nanometers. The carbon nanodots may include carbon, oxygen, nitrogen, and hydrogen as constituent elements. The carbon nanodots may also be characterized by their high water-solubility, biocompatibility, non-toxicity, high chemical and thermal stability, mobility in the reservoir medium, colloidal stability in harsh reservoir environment, and scalability to mass production and commercial application. In embodiments, the carbon nanodots may be used as a tracer in oilfield applications.

Some embodiments of the present disclosure relate to systems and methods for the use and application of carbon nanodots for the active wettability alteration of surfaces of solid substrates. The carbon nanodots can be applied for wettability alteration studies on solid surfaces. The effect of the carbon nanodots on changing the contact angle (both statically and dynamically) for a drop of crude oil on a surface of a solid substrate is further disclosed in the present disclosure.

The present disclosure further relates to methods and systems of using the carbon nanodots in enhanced oil recovery to improve recovery of hydrocarbons such as crude oil from hydrocarbon bearing subterranean formations. The methods of enhanced oil recovery of the present disclosure may be conducted under extreme reservoir conditions of high temperature (up to 250° C.), high pressures (up to 6,000 psi), high salinity (up to 240,000 ppmw TDS), or combinations of these.

Embodiments of the present disclose include systems and methods for using and applying the carbon nanodots for enhanced oil recovery to improve hydrocarbon production from hydrocarbon bearing subterranean formations. More specifically, embodiments of the present disclosure relate to the methods and systems for the use and application of the carbon nanodots for deep-reservoir EOR with validation using coreflood and spontaneous imbibition tests. In some embodiments, the CND efficiency may be compared against conventional surfactant systems. The methods of enhancing recovery of hydrocarbons may include treating one or more subterranean formations with a treatment fluid comprising the carbon nanodots of the present disclosure. The carbon nanodots may change the wettability characteristics of the rock in the subterranean formations, such as reducing the oil wettability of the rock surfaces, which may operate to release or break hydrocarbon fluids (crude oil) from the pores of the rock so they can flow towards the production well. The carbon nanodots may also resist adsorption onto the surface of the rock, which may allow the carbon nanodots to travel farther into the subterranean formations to enhance oil recovery from the deep reservoir regions, such as regions of the subterranean formation more than 100 meters from the injection well.

According to a first aspect of the present disclosure, a method for modifying surface wettability of a surface of a solid substrate may include contacting the surface of the solid substrate with a brine solution comprising carbon nanodots. The carbon nanodots may comprise carbon, oxygen, nitrogen, and hydrogen and may comprise one or more functional groups selected from amine groups, amide groups, carbonyl groups, carboxylate groups, hydroxylate groups, hydroxylamine groups, or combinations of these disposed at outer surfaces of the carbon nanodots. The brine solution may comprise a salinity of greater than 30,000 total dissolved solids (TDS). A concentration of carbon nanodots in the brine solution may be less than or equal to 500 parts per million by weight. Contacting the solid substrate with the brine solution comprising the carbon nanodots may be characterized by a contact duration, a contact volume, or both, that may be sufficient to reduce the oil wettability of the surface of the solid substrate by at least 15%, as defined by a contact angle of a crude oil droplet contacted with the surface of the solid substrate.

A second aspect of the present disclosure may include the first aspect, where contacting the surface of the solid substrate with the brine solution comprising the carbon nanodots may increase the hydrophilicity of the surface of the solid substrate.

A third aspect of the present disclosure may include either one of the first or second aspects, where contacting the surface of the solid substrate with the brine solutions comprising the carbon nanodots may increase the water wettability of the surface of the solid substrate as demonstrated by a reduction in a contact angle of a crude oil droplet contacted with the surface of the solid substrate.

A fourth aspect of the present disclosure may include any one of the first through third aspects, where contacting the surface of the solid substrate with the brine solution comprising the carbon nanodots may reduce a contact angle of a crude oil droplet contacted with the surface of the solid substrate.

A fifth aspect of the present disclosure may include any one of the first through fourth aspects, where contacting the surface of the solid substrate with the brine solution comprising the carbon nanodots may reduce the contact angle of a crude oil droplet contacted with the surface of the solid substrate by at least 15%.

A sixth aspect of the present disclosure may include any one of the first through fifth aspects, where the solid substrate may be carbonate rock, sandstone rock, porous metals, solid metals, glass, polymeric materials, or combinations of these.

A seventh aspect of the present disclosure may include any one of the first through sixth aspects, where the solid substrate may be carbonate rock or sandstone rock of a subterranean formation.

An eighth aspect of the present disclosure may include any one of the first through seventh aspects, where the solid substrate may be carbonate rock saturated with crude oil or an aqueous solution or sandstone rock saturated with crude oil or an aqueous solution.

A ninth aspect of the present disclosure may include any one of the first through eighth aspects, where the contact duration may be greater than or equal to 30 minutes.

A tenth aspect of the present disclosure may include any one of the first through eighth aspects, where the contact volume of the brine solution comprising the carbon nanodots may be sufficient to contact the carbon nanodots with the surface of the solid substrate.

An eleventh aspect of the present disclosure may include any one of the first through tenth aspects, where the solid substrate may be sandstone rock or carbonate rock and the contact volume of the brine solution comprising the carbon nanodots may be greater than or equal to 1 times the total pore volume of the solid substrate.

A twelfth aspect of the present disclosure may include any one of the first through eleventh aspects, comprising contacting the solid substrate with the brine solution comprising the carbon nanodots at a temperature of greater than or equal to 100° C., or greater than or equal to 200° C.

A thirteenth aspect of the present disclosure may include any one of the first through twelfth aspects, comprising contacting the solid substrate with the brine solution comprising the carbon nanodots at a salinity of greater than or equal to 75,000 parts per million to 120,000 parts per million.

A fourteenth aspect of the present disclosure may include any one of the first through thirteenth aspects, where the brine solution may comprise a salinity of from greater than 30,000 TDS to 240,000 TDS.

A fifteenth aspect of the present disclosure may include any one of the first through fourteenth aspects, where the concentration of carbon nanodots in the brine solution may be from 10 ppm by weight to 100 ppm by weight.

A sixteenth aspect of the present disclosure may include any one of the first through fifteenth aspects, where the carbon nanodots may comprise an average particle diameter of less than 10 nanometers (nm) or from 2 nm to 8 nm.

A seventeenth aspect of the present disclosure may include any one of the first through sixteenth aspects, where the carbon nanodots may be spherical.

An eighteenth aspect of the present disclosure may include any one of the first through seventeenth aspects, where the carbon nanodots may comprise an oxygen content of greater than 20 mole percent.

A nineteenth aspect of the present disclosure may include any one of the first through eighteenth aspects, where at least 50% of the functional groups at the surface of the carbon nanodots may comprise amide groups, carboxylate groups, hydroxyl groups, or combinations of these.

A twentieth aspect of the present disclosure may include any one of the first through nineteenth aspects, where the functional groups disposed at the outer surfaces of the carbon nanodots may be chemically bonded to a matrix of the carbon nanodots.

A twenty-first aspect of the present disclosure may include any one of the first through twentieth aspects, where the functional groups disposed at the outer surfaces of the carbon nanodots may be covalently bonded to the matrix of the carbon nanodots.

A twenty-second aspect of the present disclosure may include any one of the first through twentieth aspects, wherein the functional groups disposed at the outer surfaces of the carbon nanodots may be chemically bonded to a compound deposited onto the surface of the carbon nanodots.

A twenty-third aspect of the present disclosure may include any one of the first through twenty-second aspects, where the carbon nanodots do not include phosphorous.

A twenty-fourth aspect of the present disclosure may include any one of the first through twenty-third aspects, where the carbon nanodots may be hydrophilic.

A twenty-fifth aspect of the present disclosure may include any one of the first through twenty-fourth aspects, where the carbon nanodots may have a zeta potential of greater than −10 millivolts in a solution consisting of the carbon nanodots and deionized water.

A twenty-sixth aspect of the present disclosure may include any one of the first through twenty-fourth aspects, where the carbon nanodots may be produced by a process that may include heating an aqueous mixture of citric acid and an alcohol amine at a temperature of from 50° C. to 100° C. to remove the majority of the water and produce a viscous solution, heating the viscous solution at a temperature of greater than or equal to 200° C. for greater than or equal to 2 hours to produce the carbon nanodots, and collecting the carbon nanodots. The carbon nanodots may have an average particle diameter of less than 10 nm, and the carbon nanodots may include the one or more amine groups, amide groups, carbonyl groups, hydroxylamine groups, or combinations of these disposed at the outer surfaces of the carbon nanodots.

A twenty-seventh aspect of the present disclosure may include the twenty-sixth aspect, further comprising washing and purifying the carbon nanodots.

A twenty-eighth aspect of the present disclosure may include either one of the twenty-sixth or twenty-seventh aspects, where the amine compound comprises one or more alcohol amines, polyetheramines, or combinations of these.

A twenty-ninth aspect of the present disclosure may include any one of the twenty-sixth through twenty-eighth aspects, where the amine compound comprises one or more alcohol amines selected from methanolamine, ethanolamine, propanolamine, or combinations of these.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE FIGURES

The following detailed description of specific embodiments of the present disclosure can be best understood when read in conjunction with the following drawings, where like structure is indicated with like reference numerals and in which.

DETAILED DESCRIPTION

Embodiments of the present disclosure relate to systems and methods for the use and application of carbon-based nanodots (CND) to alter surface wettability of solid substrates at high temperature, high pressures, and high salinity conditions. The carbon-based nanodots will be referred to throughout the present disclosure using the term "carbon nanodots." More specifically, the present disclosure relates to systems and methods for the use and application of carbon nanodots with the capability to alter wettability of solid substrates in very low concentrations of the carbon nanodots, such as, for example, concentrations from 10 parts per million by weight (ppmw) to 500 ppmw, or 10 ppmw to 100 ppmw. In embodiments, a method for modifying a surface wettability of a surface of a solid substrate may include contacting the surface of the solid substrate with a brine solution comprising the carbon nanodots. The carbon nanodots may include carbon, oxygen, nitrogen, and hydrogen as its constituent elements. The carbon nanodots may include one or more functional groups selected from amine groups, amide groups, carbonyl groups, carboxylate groups, hydroxylate groups, hydroxylamine groups, or combinations of these disposed at outer surfaces of the carbon nanodots. A concentration of carbon nanodots in the brine solution may be less than or equal to 500 ppmw based on the total weight of the brine solution. The brine solution may have a salinity of greater than 30,000 total dissolved solids (TDS). Contacting the solid substrate with the brine solution comprising the carbon nanodots may be characterized by a contact duration, a contact volume, or both, that is sufficient to reduce the oil wettability of the surface of the solid substrate by at least 15%, as defined by a contact angle of a crude oil droplet contacted with the surface of the solid substrate.

Figure 7:
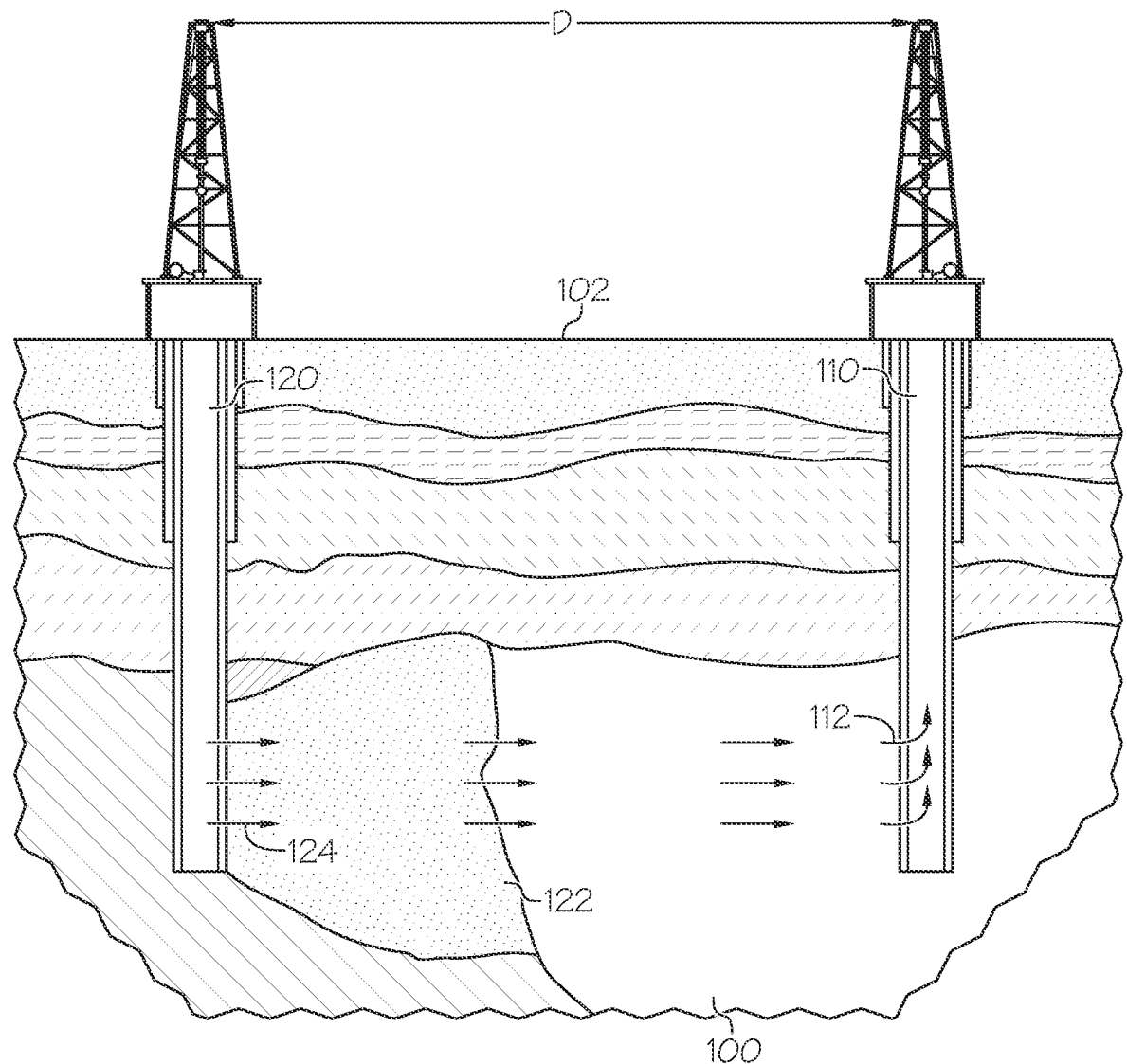
FIG. 7 schematically depicts enhanced oil recovery in a hydrocarbon-bearing subterranean formation, according to one or more embodiments shown and described in the present disclosure.

Further embodiments of the present disclosure relate to systems and methods for the use and application of the carbon nanodots for enhanced oil recovery (EOR) from hydrocarbon-bearing subterranean formations under extreme reservoir conditions of high temperature (up to or exceeding 150° C.), high pressure (up to 6,000 psi), and high salinity, (up to TDS of 240,000 ppmw). The systems and methods may include the use and application of the carbon nanodots for oil recovery in very low concentrations (10 ppmw-500 ppmw or from 10 ppmw-100 ppmw) of the carbon nanodots in the treatment fluid and for potential benefit to deep-reservoir EOR. The carbon nanodots may be highly stable under harsh reservoir conditions and scalable for industrial production which makes it well suited for oilfield applications. Referring to FIG. 7, in embodiments, a method for enhanced oil recovery of hydrocarbons from a hydrocarbon-bearing subterranean formation is schematically depicted. The method for enhanced oil recovery may include withdrawing hydrocarbons 112 from a production well 110 extending into a first subterranean formation 100 and injecting the treatment fluid 124 comprising carbon nanodots dispersed in a brine solution from an injection well 120 into a second subterranean formation 122 adjacent to the first subterranean formation 100. The first subterranean 100 is a hydrocarbon-bearing subterranean formation. The carbon nanodots include carbon, oxygen, nitrogen, and hydrogen as constituent elements and may include one or more functional groups selected from amine groups, amide groups, carbonyl groups, carboxylate groups, hydroxylate groups, hydroxylamine groups, or combinations of these disposed at outer surfaces of the carbon nanodots. A concentration of the carbon nanodots in the treatment fluid 124 may be less than or equal to 500 ppmw based on the total weight of the treatment fluid 124. The injected treatment fluid 124 may flow from the second subterranean formation 122 into the first subterranean formation 100. Injection of the treatment fluid 124 comprising the carbon nanodots may be characterized by an injection duration, an injection pressure, an injection volume, or a combination of these, that is sufficient to increase cumulative oil recovery of hydrocarbons from the first subterranean formation 100, the second subterranean formation 122, or both by at least 10% compared to injecting the brine solution without the carbon nanodots.

The method for enhanced oil recovery using treatment fluids comprising the carbon nanodots of the present disclosure may increase the cumulative oil recovery compared to treating the hydrocarbon bearing subterranean formation with brine solutions or injection fluids including conventional oilfield additive agents. The carbon nanodots in the treatment fluids of the present disclosure may be suitable for enhanced oil recovery (EOR) under extreme reservoir conditions of high temperature, high pressure, and high salinity. The carbon nanodots of the present disclosure may also resist adsorption into the rock of the subterranean formations, which may enable the carbon nanodots and treatment fluids containing the carbon nanodots to penetrate deeper into the subterranean formations compared to surfactants, polymers and other conventional oilfield additive agents. Other benefits of the methods of the present disclosure may also be apparent from practicing the subject matter.

As used throughout the present disclosure, the term "contact angle" refers to an angle between a surface of a solid substrate and a line tangent to an outer surface of a crude oil droplet disposed on the surface of the solid substrate at the point where the outer surface of the oil droplet contacts the surface of the solid substrate. As used throughout the present disclosure, the contact angle defined above has a maximum theoretical value of 180 degrees when the surface is completely lyophilic and hydrophobic (completely oil wettable) and a minimum theoretical valve of zero when the surface of the solid substrate is completely hydrophilic and lyophobic (completely water wettable and not oil wettable). It is noted that literature in the art may report contact angle as the angle through the droplet, which would be equal to 180 degrees minus the contact angle as defined in the present specification.

As used throughout the present disclosure, the term "crude oil" refers to liquid hydrocarbons extracted from a hydrocarbon bearing subterranean formation. The term crude oil may include oil extracted from hydrocarbon bearing subterranean formations and subjected to desalting processes. However, crude oil is not intended to include effluents resulting from separation of the crude oil into various hydrocarbon fractions or effluents produced by processes for upgrading the crude oil through one or more chemical reactions, such as cracking, hydrocracking, reforming, or other upgrading reaction.

As used throughout the present disclosure, the term "hydrocarbon-bearing subterranean formation" refers to a below-ground geologic region containing hydrocarbons, such as crude oil, hydrocarbon gases, or both, which may be extracted from the geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery.

As used throughout the present disclosure, the term "original oil in place" or "OOIP" may refer to the total volume of hydrocarbons contained in a subterranean reservoir or rock sample (such as a core sample) prior to production of hydrocarbons from the subterranean formation or rock sample.

As used in the present disclosure, the term "uphole" refers to a direction in a wellbore that is towards the surface. For example, a first component that is uphole relative to a second component is positioned closer to the surface of the wellbore relative to the second component.

As used in the present disclosure, the term "downhole" refers to a direction further into the formation and away from the surface. For example, a first component that is downhole relative to a second component is positioned farther away from the surface of the wellbore relative to the second component.

As previously discussed, a method for modifying the surface wettability of a surface of a solid substrate includes contacting the surface of the solid substrate with a brine solution comprising the carbon nanodots of the present disclosure. Contacting the surface of the solid substrate with the brine solution comprising the carbon nanodots may be characterized by a contact duration, a contact volume, or both, that is sufficient to reduce the oil wettability of the surface of the solid substrate by at least 15%, as defined by a contact angle of an oil droplet contacted with the surface of the solid substrate.

The solid substrate may be carbonate rock, sandstone rock, porous metals, solid metals, glass, polymeric materials, or combinations of these. In embodiments, the solid substrate may be carbonate rock or sandstone rock, such as carbonate rock or sandstone rock of a subterranean formation. In embodiments, the solid substrate may be at least partially or fully saturated with one or more fluids, such as crude oil, an aqueous solution, other fluid, or combinations of these. The aqueous solution saturating the solid substrate may be a brine solution, such as seawater, formation water, produced water, or other brine solution comprising water and at least one salt. In embodiments, the solid substrate may be carbonate rock or sandstone rock that is at least partially or fully saturated with crude oil or an aqueous solution.

The carbon nanodots of the present disclosure are carbon-based nanoparticles that are surface functionalized to provide specific properties to the carbon-based nanoparticles. The carbon nanodots may comprise the elements carbon, oxygen, nitrogen, and hydrogen as their constituent elements. The carbon nanodots may have a nanocrystalline structure that makes the carbon nanodots inherently fluorescent and highly detectable in trace amounts (down to single-digit part per billion levels). The carbon nanodots are characterized by their high water-solubility, biocompatibility, non-toxicity, high chemical and thermal stability, mobility in the reservoir medium, colloidal stability in harsh reservoir environment, "one-pot" synthesis method, and scalability to mass production and commercial field applications. In embodiments, the carbon nanodots may consist of or consist essentially of the elements carbon, oxygen, nitrogen, and hydrogen. The carbon, oxygen, nitrogen, and hydrogen may be bonded together during synthesis of the carbon nanodots to form a nanocrystalline matrix structure (matrix) comprising the carbon, oxygen, nitrogen, and hydrogen as constituent elements. The carbon nanodots may have an oxygen content of greater than 20 mole percent (mol %), greater than or equal to 25 mol %, or even greater than or equal to 28 mol %. In embodiments, the carbon nanodots do not include phosphorous as an intended constituent element. In embodiments, the carbon nanodots comprise less than 0.1 mole percent (mol %), less than 0.01 mol %, or even less than 0.001 mol % phosphorous atoms based on the total weight of the carbon nanodots.

As previously discussed, the carbon nanodots may be surface functionalized. As used herein, surface functionalized refers to the introduction of functional groups to the surface of the carbon nanodots that allows the carbon nanodots to remain dispersed and suspended, and without having an affinity to stick or bind to the surface of solid substrates, such as carbonate rock or sandstone rock in subterranean formations. The carbon nanodots may include one or more functional groups disposed at outer surfaces of the carbon nanodots. The functional groups disposed at the outer surfaces of the carbon nanodots may include one or more amine groups, amide groups, carbonyl groups, carboxylate groups, hydroxylate groups, hydroxylamine groups, or combinations of these. The functional groups disposed at the outer surfaces of the carbon nanodots may be selected from the group consisting of amine groups, amide groups, carbonyl groups, carboxylate groups, hydroxylate groups, hydroxylamine groups, or combinations of these. In embodiments, the functional groups disposed at the outer surfaces of the carbon nanodots may include amide groups, carboxylate groups, hydroxyl groups, or combinations of these. In embodiments, at least 50%, at least 60%, at least 65%, or at least 70% of the functional groups disposed at the outer surfaces of the carbon nanodots may comprise amide groups, carboxylate groups, hydroxyl groups, or combinations of these. In embodiments, the functional groups may include primary amines, primary amino alcohols, polyetheramines, or combinations of these. One such exemplary amino alcohol is ethanolamine. In certain embodiments, methanolamine and propanolamine can also be used. In certain embodiments, secondary amines or alcohols can be used. In other embodiments, the functional groups can be selected based upon their ability to modify the surface wettability of surfaces contacted with a solution of the carbon nanodots. In embodiments, the functional groups may be present in an amount of between about 50% and 90% by weight, alternatively between about 60% and 80% by weight, alternatively between about 70% and 80% by weight, alternatively between about 65% and 75% by weight.

The functional groups disposed at the outer surfaces of the carbon nanodots may be chemically bonded to a matrix of the carbon nanodots, such as through covalent bonds, ionic bonding, hydrogen bonding, other types of chemical bond, or combinations of these. In embodiments, the functional groups disposed at the outer surfaces of the carbon nanodots may be covalently bonded to the matrix of the carbon nanodots. In embodiments, the functional groups disposed at the outer surfaces of the carbon nanodots are chemically bonded to a compound deposited onto the outer surfaces of the carbon nanodots, such as a compound coated or otherwise deposited onto the outer surfaces of the carbon nanodots. The carbon nanodots may be the condensation reaction product of citric acid and an alcohol amine, such as but not limited to methanolamine, ethanolamine, propanolamine, or combinations of these. In embodiments, the carbon nanodots may be the condensation reaction product of citric acid and one or more polyetheramines.

Figure 1:
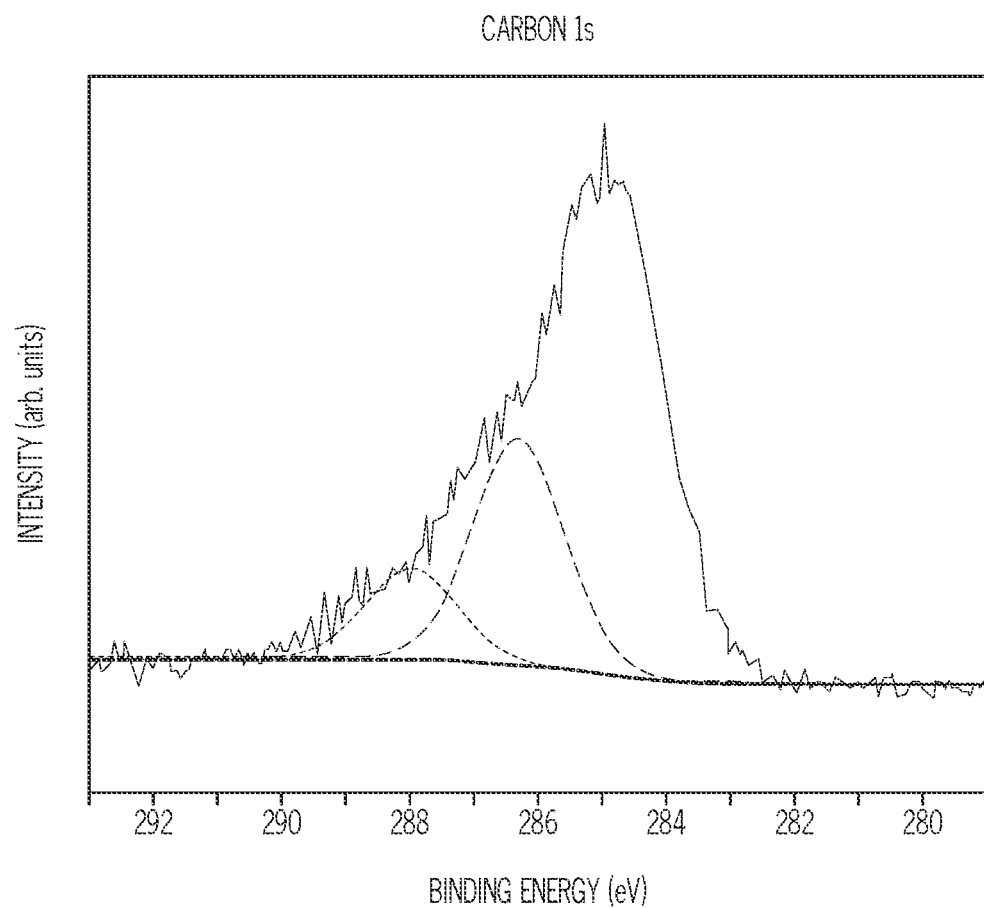
FIG. 1 schematically depicts an X-Ray Photoelectron Spectroscopy (XPS) of the carbon nanodots of the present disclosure, according to one or more embodiments shown and described in the present disclosure.

Referring now to FIG. 1, an XPS spectra of the synthesized carbon nanodots of the present disclosure is graphically depicted. The XPS spectra shows the carbon nanodots having 61.7% of C—C bonding and 28.1% C—O—C bonding. This implies that the synthesized carbon nanodots may be highly hydrophilic. The functional groups disposed at the surfaces of the carbon nanodots may be selected to provide different properties to the carbon nanodots, such as functional groups that make the carbon nanodots amphiphilic or hydrophobic for example.

Figure 2:
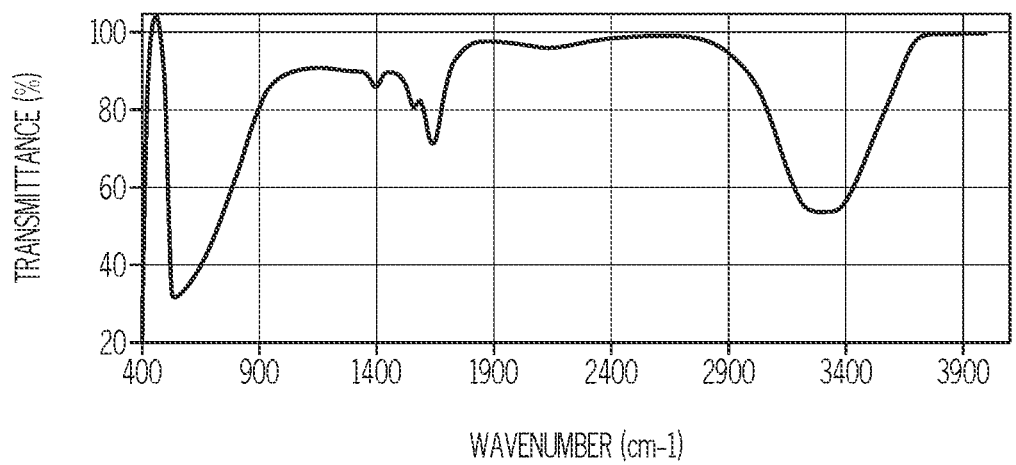
FIG. 2 schematically depicts a Fourier-transform infrared spectroscopy (FTIR) spectra of the carbon nanodots of the present disclosure, according to one or more embodiments shown and described in the present disclosure.

As previously discussed, the carbon nanodots may be the condensation reaction product of citric acid and an alcohol amine, such as ethanolamine. Referring to FIG. 2, the FTIR spectra of an embodiment of the carbon nanodots comprising the condensation reaction product of citric acid and ethanolamine is graphically depicted. The carbon nanodots analyzed in FIG. 2 exhibited absorption of carbonyl functional groups (wavenumber of about 1650), carboxyl-amide functional groups (wavenumber of about 1600), and hydroxylamine functional groups (wavenumber in the range 3250-3300), and accordingly a presence of —CO (carbonyl), —COO/—CONH$_2$ (carboxyl-amide), and —OH/—NH (hydroxylamine) groups in its structure. The carbonyl shift of the citric acid precursor is an indication that the citric acid is transformed into the carbon nanodots with no remains of the starting materials in the product. In addition, the FTIR spectra of FIG. 2 shows no absorption corresponding to C—H. This implies that the citric acid and ethanolamine precursors are fully carbonized. Thus, the carbon nanodots of the present disclosure may be fully carbonized as evidenced by the absence of a peak corresponding to C—H in a Fourier-transformed infrared (FTIR) spectra of the carbon nanodots. In embodiments, the carbon nanodots may have less than 0.1 wt. %, less than 0.01 wt. %, or even less than 0.001 wt. % unreacted starting precursors based on the total weight of the carbon nanodots.

The carbon nanodots of the present disclosure may have a zeta potential of greater than or equal to −10 millivolts in a solution consisting of the carbon nanodots and deionized water. The zeta potential may be determined through zeta potential measurements carried out using a Malvern Zetasizer (Malvern Instruments, Nanoseries). In seawater, the carbon nanodots of the present disclosure may have a zeta potential of greater than or equal to +10 millivolts, greater than or equal to +20 millivolts, greater than or equal to +30 millivolts, or +38 millivolts. The zeta potential of the carbon nanodots of the present disclosure indicates that the carbon nanodots have excellent stability with good electrostatic repulsion, particularly in high salinity solutions (salinity greater than 30,000 ppmw). The stability of the carbon nanodots means that the carbon nanodots may not have a tendency to agglomerate in saline solutions of different saline contents.

The carbon nanodots may have any shape. In embodiments, the carbon nanodots may be generally spherical in shape. The carbon nanodots may have an average particle diameter of from 1 nanometer (nm) to 100 nm. In embodiments, the carbon nanodots may have an average particle diameter of less than or equal to 10 nm, less than or equal to 8 nm, or even less than or equal to 5 nm. The carbon nanodots may have an average particle diameter greater than or equal to 1 nm, greater than or equal to 2 nm, or even greater than or equal to 3 nm. In embodiments, the carbon nanodots may have an average particle size of from 1 nm to 10 nm, from 2 nm to 8 nm, or from 3 nm to 5 nm. The carbon nanodots have been found to have consistent average particle diameter in a range of solutions of differing salinity, such as seawater and formation water. Thus, the carbon nanodots are stable and do not have a tendency to agglomerate when exposed to high-salinity solutions, such as solutions and treatment fluids having salinity greater than 30,000 ppmw.

The carbon nanodots may be stable at temperatures of from 25° C. to 150° C., and even greater than 150° C. As used in the present disclosure in reference to the carbon nanodots, the term "stable" may refer to the carbon nanodots not changing substantially in composition or form. For example, when stable, the composition of the carbon nanodots remains constant and the carbon nanodots do not show a strong tendency to agglomerate into larger particles. While some agglomeration may occur, the change in average particle size of the stable carbon nanodots is minimal. In embodiments, the carbon nanodots may be stable at temperatures of up to 250° C., up to 200° C., or up to 150° C. In embodiments, the carbon nanodots may be stable at temperatures of from 25° C. to 250° C., from 25° C. to 200° C., from 25° C. to 150° C., from 50° C. to 250° C., from 50° C. to 200° C., from 50° C. to 150° C., from 100° C. to 250° C., from 100° C. to 200° C., or from 100° C. to 150° C.

The carbon nanodots may be stable in a brine solution that includes the following compounds at the following concentrations: NaCl (128.9 g/L), CaCl$_2$.2H$_2$O (109.16 g/L), MgCl$_2$.6H$_2$O (35.66 g/L), BaCl$_2$ (0.02 g/L), Na$_2$SO$_4$ (0.16 g/L) and NaHCO$_3$ (0.48 g/L), totaling a concentration of about 120,000 ppm of total dissolved solids. The carbon nanodots have been found to be stable in water, alternatively in brine solutions having a total dissolved solids concentration of between 100 ppm and 25,000 ppm, alternatively in brine solutions having a total dissolved solids concentration of between 25,000 ppm and 50,000 ppm, alternatively in brine solutions having a total dissolved solids concentration of between 50,000 ppm and 100,000 ppm, alternatively in brine solutions having a total dissolved solids concentration of greater than 100,000 ppm. Stability has also been demonstrated in connate water having a concentration of 220,000 ppm TDS.

The carbon nanodots can be synthesized in a simple, one-pot reaction. Carbon nanodots may be produced hydrothermally, followed by surface functionalization. Accordingly, the process is very amenable for scale-up to the kilogram level in a non-industrial research lab environment. The synthesis is also very economical, with a current cost of less than about $10.00/kg. In embodiments, the carbon nanodots may be produced by a method that includes heating an aqueous mixture of citric acid and an amine compound at a temperature of from 50° C. to 100° C. to remove the majority of the water and produce a viscous solution, heating the viscous solution at a temperature of greater than or equal to 200° C. for greater than or equal to 2 hours to produce the carbon nanodots, and collecting the carbon nanodots. The carbon nanodots made according this method may have an average particle diameter of less than 10 nm. The carbon nanodots may include one or more amine groups, amide groups, carbonyl groups, hydroxylamine groups, or combinations of these disposed at the outer surfaces of the carbon nanodots. The amine compound comprises one or more amines, alcohol amines, polyetheramines, or combinations of these. In embodiments, the amine compound comprises one or more alcohol amines selected from methanolamine, ethanolamine, propanolamine, or combinations of these. In embodiments, the amine compound may include JEFFAMINE® polyetheramines from Huntsman. The methods of making the carbon nanodots may further include washing and purifying the carbon nanodots.

As previously discussed, in the method of modifying the surface wettability of a surface of a solid substrate, the surface of the solid substrate is contacted with the brine solution comprising the carbon nanodots. The brine solution may have a salinity of greater than 30,000 ppmw total dissolved solids (TDS), greater than or equal to 50,000 ppmw TDS, greater than or equal to 75,000 ppmw TDS, or even greater than or equal to 100,000 ppmw TDS based on the total weight of the brine solution. The brine solution may have a salinity of less than or equal to 240,000 ppmw TDS, less than or equal to 220,000 ppmw TDS, less than or equal to 200,000 ppmw TDS, less than or equal to 150,000 ppmw TDS, or even less than or equal to 120,000 ppmw TDS based on the total weight of the brine solution. In embodiments, the brine solution may have a salinity of from 30,000 ppmw TDS to 240,000 ppmw TDS, from 30,000 ppmw TDS to 220,000 ppmw TDS, from 30,000 ppmw TDS to 200,000 ppmw TDS, from 50,000 ppmw TDS to 240,000 ppmw TDS, from 50,000 ppmw TDS to 220,000 ppmw TDS, from 50,000 ppmw TDS to 200,000 ppmw TDS, from 75,000 ppmw TDS to 240,000 ppmw TDS, from 75,000 ppmw TDS to 220,000 ppmw TDS, from 75,000 ppmw TDS to 200,000 ppmw TDS, from 75,000 ppmw TDS to 150,000 ppmw TDS, from 75,000 ppmw TDS to 120,000 ppmw TDS, from 100,000 ppmw TDS to 240,000 ppmw TDS, from 100,000 ppmw TDS to 220,000 ppmw TDS, or from 100,000 ppmw TDS to 200,000 ppmw TDS based on the total weight of the brine solution. The brine solution may include water and one or more salts. The salts are not particularly limited and may include, but are not limited to, alkali metal salts, alkaline earth metal salts, other metal salts, halides, sulphates, carbonates, hydroxides, and other ionic species. The brine solution may include seawater, connate water, formation water, produced water, brine solutions from crude desalting operations, synthesized brine solutions, or other aqueous composition having the requisite salinity. Synthesized brine solutions may refer to brine solutions prepared by purposely adding one or more ionic constituents (salts) to low-salinity water, such as but not limited to municipal water, deionized water, distilled water, well water, or other low-salinity water source.

The concentration of carbon nanodots in the brine solution may be sufficient to change the surface wettability of the surface of the solid substrate when the brine solution is contacted with the surface of the solid substrate. The concentration of carbon nanodots in the brine solution may be less than or equal to 500 ppmw, less than or equal to 300 ppmw, less than or equal to 200 ppmw, less than or equal to 100 ppmw, or even less than or equal to 50 ppmw based on the total weight of the brine solution. The concentration of carbon nanodots in the brine solution may be greater than or equal to 10 ppmw, greater than or equal to 20 ppmw, or greater than or equal to 50 ppmw based on the total weight of the brine solution. The brine solution may include from 10 ppmw to 500 ppmw, from 10 ppmw to 300 ppmw, from 10 ppmw to 200 ppmw, from 10 ppmw to 100 ppmw, from 10 ppmw to 50 ppmw, from 20 ppmw to 500 ppmw, from 20 ppmw to 300 ppmw, from 20 ppmw to 200 ppmw, from 20 ppmw to 100 ppmw, or from 20 ppmw to 50 ppmw carbon nanodots based on the total weight of the brine solution.

The surface of the solid substrate may be contacted with the brine solution comprising the carbon nanodots at ambient temperatures or temperatures greater than ambient temperature. The surface of the solid substrate may be contacted with the brine solution comprising the carbon nanodots at temperatures greater than or equal to 25° C., greater than or equal to 50° C., greater than or equal to 100° C., greater than or equal to 150° C., or even greater than or equal to 200° C. The surface of the solid substrate may be contacted with the brine solution comprising the carbon nanodots at a temperature of from 25° C. to 250° C., from 50° C. to 200° C., from 100° C. to 250° C., or even from 100° C. to 200° C. The surface of the solid substrate may be contacted with the brine solution comprising the carbon nanodots at a salinity of from 30,000 ppmw to 240,000 ppmw, from 30,000 ppmw to 220,000 ppmw, from 30,000 ppmw to 200,000 ppmw, from 50,000 ppmw to 240,000 ppmw, from 50,000 ppmw to 220,000 ppmw, from 50,000 ppmw to 200,000 ppmw, from 75,000 ppmw to 240,000 ppmw, from 75,000 ppmw to 220,000 ppmw, from 75,000 ppmw to 200,000 ppmw, from 75,000 ppmw to 150,000 ppmw, from 75,000 ppmw to 120,000 ppmw, from 100,000 ppmw to 240,000 ppmw, from 100,000 ppmw to 220,000 ppmw, or from 100,000 ppmw to 200,000 ppmw.

Contacting the solid substrate with the brine solution comprising the carbon nanodots according to the methods disclosed herein may be characterized by a contact duration, a contact volume, or both, that is sufficient to reduce the oil wettability of the surface of the solid substrate. The surface of the solid substrate may be contacted with the brine solution comprising the carbon nanodots for a contact duration sufficient to modify the surface wettability of the surface of the solid substrate. The contact duration may be greater than or equal to 30 minutes, or greater than or equal to 60 minutes. The contact duration may be from 30 minutes to 24 hours, from 30 minutes to 12 hours, from 30 minutes to 6 hours, from 30 minutes to 3 hours, from 30 minutes to 1 hour, from 1 hour to 24 hours, from 1 hour to 12 hours, from 1 hour to 6 hours, or from 1 hour to 3 hours. The method of claim 1, where the contact duration is greater than or equal to 30 minutes. The surface of the solid substrate may be contacted with a contact volume of the brine solution that is sufficient to contact the carbon nanodots with the surface of the solid substrate. In embodiments, the solid substrate may be a porous solid, such as a sandstone rock, carbonate rock, or porous metal, and the contact volume of the brine solution comprising the carbon nanodots may be greater than or equal to at least one times the total pore volume of the solid substrate, or at least two times the total pore volume of the solid substrate, where the total pore volume is determined using known methods.

Contacting the surface of the solid substrate with the brine solution comprising the carbon nanodots may increase the hydrophilicity of the surface of the solid substrate. Conversely, contacting the surface of the solid substrate with the brine solution comprising the carbon nanodots may decrease the lyophilicity of the surface of the solid substrate. Increasing the hydrophilicity of the surface of the solid substrate may increase the water wettability and decrease oil wettability of the surface. Thus, contacting the surface of the solid substrate with the brine solutions comprising the carbon nanodots may increase the water wettability of the surface of the solid substrate, which may be demonstrated by a reduction in a contact angle of an oil droplet contacted with the surface of the solid substrate. Contacting the solid substrate with the brine solution comprising the carbon nanodots according to the methods disclosed herein for the contact duration, the contact volume, or both, may reduce the oil wettability of the surface of the solid substrate by greater than or equal to 15%, greater than or equal to 20%, greater than or equal to 30%, or even greater than or equal to 40%, as demonstrated by a contact angle of a crude oil droplet contacted with the surface of the solid substrate.

Contacting the surface of the solid substrate with the brine solution comprising the carbon nanodots may reduce the contact angle of a crude oil droplet contacted with the surface of the solid substrate. Contacting the surface of the solid substrate with the brine solution comprising the carbon nanodots may reduce the contact angle of a crude oil droplet contacted with the surface of the solid substrate by greater than or equal to 15%, greater than or equal to 20%, greater than or equal to 30%, or even greater than or equal to 40%, as determined using the methods described.

The methods of modifying surface wettability of the surface of the solid substrate of the present disclosure may further include preparing the brine solution comprising the carbon nanodots. Preparing the brine solution may include providing a brine solution having any of the features previously discussed for the brine solution and combining carbon nanodots with the brine solution. Preparing the brine solution comprising the carbon nanodots may include mixing the brine solution and the carbon nanodots for a period of time sufficient to disperse and/or dissolve the carbon nanodots in the brine solution. The method of modifying surface wettability of the surface of the solid substrate may include synthesizing the carbon nanodots. Synthesizing the carbon nanodots may be accomplished according to any of the methods of synthesizing the carbon nanodots described in the present disclosure.

The surface wettability modification properties of the carbon nanodots may provide benefits for enhanced oil recovery (EOR) processes for recovering hydrocarbons from hydrocarbon bearing subterranean formations. Conventional oilfield additive agents for chemical EOR (CEOR), such surfactants, polymers, or even other types of nanoparticles, are prone to adsorption and diffusion into the rock of the subterranean formations. Therefore, these conventional oilfield additive agents are used in much greater concentrations, which limit their use to pilots with wells that are tens of meters apart, such as from 50 meters to 100 meters apart. CEOR using conventional oilfield additive agents is most useful and successful in these small field pilot applications. The norm in conventional CEOR is to undertake field pilots with 5 or 7 wells with each of the wells spaced tens of meters apart (about 50-100 m of well to well spacing).

Such pilot well arrangements for conventional CEOR fade by comparison to the scale of operation and requirements of large prolific oilfields, such as those in Saudi Arabia for example. This is not practical for the arrangements of current wells of Saudi Arabia, in particular, where wells are spaced at more than 1,000 meters apart on average and injector wells are only drilled at the edges of the reservoirs. The current practice in the large prolific oilfields of the world is to perform peripheral water injections at the edges of the reservoir to maintain reservoir pressure and provide a slow water drive mechanism to sustain the health and productivity of the oilfield on the long run.

Large prolific oilfields can be as large as nearly 280 kilometers by 30 kilometers. Injectors are positioned outside the field in the flanks of the reservoir and only production wells or observation wells are drilled inside the oilfield. Production wells are drilled roughly at a one kilometer distance from each other. The CEOR challenge in large prolific oilfields is caused by the adsorption and diffusion of molecular surfactants and other chemicals in the porous media of the subterranean formations. Oilfield chemicals, such as surfactants and polymers, work well in breaking and mobilizing the oil in the near wellbore region but can lose the bulk of its mass in the process. The loss of mass of polymers and surfactants may result in these conventional oilfield additive agents being unable to reach the deeper regions of the reservoir. The loss of mass can be compensated for by using large concentrations (nearing and exceeding 1% wt/v) of the conventional oilfield additive agents. This makes CEOR highly uneconomical and impractical for field use and application for large prolific oilfields.

The present disclosure includes a method for enhancing recovery of hydrocarbons from a hydrocarbon-bearing subterranean formation. Referring now to FIG. 7, a schematic diagram of an EOR or CEOR installation for enhancing oil recovery from a hydrocarbon-bearing subterranean formation 100 is depicted. One or a plurality of production wells 110 may be installed between the surface 102 and a first subterranean formation, which may be the hydrocarbon-bearing subterranean formation 100. Additionally, an injection well 120 may be installed between the surface 102 and a second subterranean formation 122 that may be adjacent to or next to the hydrocarbon-bearing subterranean formation 100. The production well 110 may be operable to transport hydrocarbons 112 from the hydrocarbon-bearing subterranean formation 100 (first subterranean formation) to the surface 102. The injection well 120 may be operable to inject a treatment fluid 124 into the second subterranean formation 122 to conduct the EOR or CEOR process.

The methods of the present disclosure for enhancing recovery of the hydrocarbons from a hydrocarbon-bearing subterranean formation 100 may include withdrawing hydrocarbons 112 from the production well 110 extending into the first subterranean formation 100 and injecting the treatment fluid 124 comprising carbon nanodots dispersed in a brine solution from the injection well 120 into the second subterranean formation 122. The first subterranean formation 100 is a hydrocarbon-bearing subterranean formation. The injected treatment fluid 124 may flow from the second subterranean formation 122 into the first subterranean formation 100. The injection of the treatment fluid 124 comprising the carbon nanodots is characterized by an injection duration, an injection pressure, an injection volume, or a combination of these, that is sufficient to increase cumulative oil recovery of the hydrocarbons 112 from the first subterranean formation 100, the second subterranean formation 122, or both by at least 10% compared to injecting the brine solution without the carbon nanodots.

The treatment fluid 124 flowing into the second subterranean formation 122 may exert pressure on the hydrocarbon fluids 112 in the first subterranean formation 100 to provide motive force for driving the hydrocarbons 112 to the production well 110. Additionally, the carbon nanodots of the treatment fluid 124 may change the wettability characteristics of the rock in the first subterranean formation 100, the second subterranean formation 122, or both, such as reducing the oil wettability of the rock surfaces, which may operate to release or break hydrocarbon fluids (crude oil) from the pores of the rock in the first subterranean formation 100, the second subterranean formation 122, or both. The carbon nanodots in the treatment fluid 124 may also resist adsorption onto the surface of the rock, which may allow the carbon nanodots to travel farther into the second subterranean formation 122 and even farther into the first subterranean formation 100 to enhance oil recovery from the deep reservoir regions, such as regions of the subterranean formation more than 100 meters from the injection well 120.

As previously discussed, the treatment fluid in the EOR method of the present disclosure may include a brine solution and carbon nanodots dispersed or dissolved in the brine solution. The carbon nanodots may have any of the features, compositions, or properties previously discussed in the present disclosure for the carbon nanodots. In particular, the carbon nanodots may be spherical and may have an average particle diameter of less than or equal to 10 nm, such as from 2 nm to 8 nm, or from 3 nm to 5 nm. The carbon nanodots may comprise, consist of, or consist essentially of carbon, oxygen, nitrogen, and hydrogen as constituent elements. In embodiments, the carbon nanodots may include an oxygen content of greater than 20 mole percent, greater than or equal to 25 mole percent, or even greater than or equal to 28 mole percent. As previously discussed, the carbon nanodots may include one or more functional groups selected from amine groups, amide groups, carbonyl groups, carboxylate groups, hydroxylate groups, hydroxylamine groups, or combinations of these disposed at outer surfaces of the carbon nanodots. In embodiments, at least 50% of the functional groups at the surface of the carbon nanodots comprise amide groups, carboxylate groups, hydroxyl groups, or combinations of these. The carbon nanodots may not include phosphorous as a constituent element. The carbon nanodots may be hydrophilic. In embodiments, the carbon nanodots may have a zeta potential of greater than negative 10 millivolts in a solution comprising the carbon nanodots and deionized water. The carbon nanodots may have any of the other features discussed in the present disclosure for the carbon nanodots.

The concentration of carbon nanodots in the treatment fluid may be sufficient to increase the cumulative oil recovery from the hydrocarbon bearing subterranean formation compared to injecting a brine solution without the carbon nanodots. In embodiments, the concentration of carbon nanodots in the treatment fluid may be sufficient to increase the cumulative oil recovery from the hydrocarbon bearing subterranean formation by at least 10% compared to injecting the brine solution without the carbon nanodots. The concentration of carbon nanodots in the treatment fluid may be less than or equal to 500 ppmw, less than or equal to 300 ppmw, less than or equal to 200 ppmw, less than or equal to 100 ppmw, or even less than or equal to 50 ppmw based on the total weight of the treatment fluid. The concentration of carbon nanodots in the treatment fluid may be greater than or equal to 10 ppmw, greater than or equal to 20 ppmw, or greater than or equal to 50 ppmw based on the total weight of the treatment fluid. The treatment fluid may include from 10 ppmw to 500 ppmw, from 10 ppmw to 300 ppmw, from 10 ppmw to 200 ppmw, from 10 ppmw to 100 ppmw, from 10 ppmw to 50 ppmw, from 20 ppmw to 500 ppmw, from 20 ppmw to 300 ppmw, from 20 ppmw to 200 ppmw, from 20 ppmw to 100 ppmw, or from 20 ppmw to 50 ppmw carbon nanodots based on the total weight of the treatment fluid.

The balance of the treatment fluid may be the brine solution. The brine solution may have a salinity of greater than 30,000 ppmw total dissolved solids (TDS), greater than or equal to 40,000 ppmw TDS, greater than or equal to 50,000 ppmw TDS, or even greater than or equal to 100,000 ppmw TDS. The brine solution may have a salinity of less than or equal to 240,000 ppmw TDS, less than or equal to 220 ppmw TDS, or even less than or equal to 200,000 ppmw TDS. In embodiments, the brine solution may have a salinity of from 30,000 ppmw TDS to 240,000 ppmw TDS, from 30,000 ppmw TDS to 220,000 ppmw TDS, from 30,000 ppmw TDS to 200,000 ppmw TDS, from 40,000 ppmw TDS to 240,000 ppmw TDS, from 40,000 ppmw TDS to 220,000 ppmw TDS, from 40,000 ppmw TDS to 200,000 ppmw TDS, from 50,000 ppmw TDS to 240,000 ppmw TDS, from 50,000 ppmw TDS to 220,000 ppmw TDS, from 50,000 ppmw TDS to 200,000 ppmw TDS, from 100,000 ppmw TDS to 240,000 ppmw TDS, from 100,000 ppmw TDS to 220,000 ppmw TDS, or from 100,000 ppmw TDS to 200,000 ppmw TDS. The brine solution may include water and one or more salts. The salts are not particularly limited and may include, but are not limited to, alkali metal salts, alkaline earth metal salts, other metal salts, halides, sulphates, carbonates, hydroxides, etc. The brine solution may include seawater, connate water, formation water, produced water, brine solutions from crude desalting operations, synthesized brine solutions, or other water containing the requisite salinity. Synthesized brine solutions refer to brine solutions prepared by purposely adding one or more salt constituents to low-salinity water, such as but not limited to municipal water, deionized water, distilled water, well water, or other low-salinity water source.

Referring again to FIG. 7, the first subterranean formation 100 is a hydrocarbon bearing subterranean formation. The second subterranean formation 122 may be adjacent to the first subterranean formation 100. In embodiments, the second subterranean formation 122 may abut against the first subterranean formation 100 so that the second subterranean formation 122 contacts and is in fluid communication with the first subterranean formation 100. The second subterranean formation 122 may be a hydrocarbon bearing formation, a non-hydrocarbon bearing subterranean formation, or a combination of these. In embodiments, the first subterranean formation 100, the second subterranean formation 122 or both may comprise carbonate rock, sandstone rock, or a combination of both of these. The injection well 120 may be spaced apart from the production well 100 by a distance D. The distance D between the injection well 120 and the production well 100 may be greater than or equal to 100 meters, greater than or equal to 200 meters, greater than or equal to 500 meters, or even greater than or equal to 1,000 meters.

The first subterranean formation 100, the second subterranean formation 122, or both may have a formation temperature of from 50° C. to 250° C., such as from 100° C. to 200° C. The first subterranean formation 100, the second subterranean formation 122, or both may have a formation pressure of from 15 pounds per square inch (103 kilopascals (kPa)) to 6,000 pounds per square inch (41,370 kPa), such as from 1,000 pounds per square inch (6,895 kPa) to 6,000 pounds per square inch (41,370 kPa). The formation fluids (hydrocarbon fluids, connate water, or both) in the first subterranean formation 100, the second subterranean formation 122, may have a salinity of from 20,000 ppmw to 240,000 ppmw, such as from 30,000 ppmw to 240,000 ppmw, from 30,000 ppmw to 220,000 ppmw, from 30,000 ppmw to 200,000 ppmw, from 50,000 ppmw to 240,000 ppmw, from 50,000 ppmw to 220,000 ppmw, from 50,000 ppmw to 200,000 ppmw, from 75,000 ppmw to 240,000 ppmw, from 75,000 ppmw to 220,000 ppmw, from 75,000 ppmw to 200,000 ppmw, from 75,000 ppmw to 150,000 ppmw, from 75,000 ppmw to 120,000 ppmw, from 100,000 ppmw to 240,000 ppmw, from 100,000 ppmw to 220,000 ppmw, or from 100,000 ppmw to 200,000 ppmw. The treatment fluid 124 may be injected into the second subterranean formation 122 at the formation temperature, the formation pressure, and the salinity of the second subterranean formation.

Injection of the treatment fluid into the second subterranean formation may be characterized by an injection duration, an injection pressure, an injection volume, or combinations of these. The injection duration, the injection pressure, the injection volume, or combinations of these may be sufficient to reduce the oil wettability of rock in the first subterranean formation, the second subterranean formation, or both, by at least about 10% to enhance recovery of hydrocarbons from the first subterranean formation, the second subterranean formation, or both. Injection of the treatment fluid comprising the carbon nanodots may be characterized by the injection duration sufficient to increase the cumulative oil recovery from the first subterranean formation by at least 10% compared to injection of a brine solution without the carbon nanodots. The injection duration may be greater than or equal to 0.5 hours, such as greater than or equal to 1 hour, greater than or equal to 2 hours, greater than or equal to 4 hours, greater than or equal to 8 hours, greater than or equal to 12 hours, or even greater than or equal to 24 hours. The injection duration may be from 0.5 hours to 48 hours, from 0.5 hours to 24 hours, from 1 hour to 48 hours, from 1 hour to 24 hours, from 2 hours to 48 hours, from 2 hours to 24 hours, from 4 hours to 48 hours, from 4 hours to 24 hours, from 8 hours to 48 hours, from 8 hours to 24 hours, from 12 hours to 48 hours, from 12 hours to 24 hours, or from 24 hours to 48 hours. In embodiments, the injection duration may be greater than 48 hours.

Injection of the treatment fluid comprising the carbon nanodots may be characterized by the injection pressure, which may be sufficient to increase the cumulative oil recovery from the first subterranean formation by at least 10% compared to injection of a brine solution without the carbon nanodots. Injection of the treatment fluid comprising the carbon nanodots can be characterized by the injection pressure that is greater than or equal to a formation pressure in the second subterranean formation and less than a pressure sufficient to cause fracture of the second subterranean formation. Injection of the treatment fluid comprising the carbon nanodots can be characterized by the injection pressure that is from 1,000 pounds per square inch (6,895 kPa) to 6,000 pounds per square inch (41,370 kPa).

Injection of the treatment fluid comprising the carbon nanodots may be characterized by the injection volume of the treatment fluid, which may be sufficient to increase the cumulative oil recovery from the first subterranean formation by at least 10% compared to injection of a brine solution without the carbon nanodots. Injection of the treatment fluid comprising the carbon nanodots may be characterized by the injection volume of the treatment fluid of greater than or equal to at least one times the total pore volume of the first subterranean formation to which the enhanced oil recovery process is targeted. In embodiments, the treatment fluid comprising the carbon nanodots may be injected as a slug of concentrated treatment fluids followed by continued injection of brine or seawater following injection of the slug. The slug comprising the treatment fluid may have a volume of from 100 barrels to 500 barrels (15.9 cubic meters to 79.5 cubic meters). The term "barrel" as used here refers to a volume equal to 42 U.S. Gallons or 0.159 cubic meter. In embodiments, the treatment fluid in the slug may have a concentration of carbon nanodots of greater than or equal to 50 ppmw, or greater than or equal to 100 ppmw based on the total weight of the treatment fluid. The treatment fluid in the slug may have a concentration of carbon nanodots of from 50 ppmw to 500 ppmw, from 50 ppmw to 300 ppmw, from 50 ppmw to 200 ppmw, from 50 ppmw to 100 ppmw, from 100 ppmw to 500 ppmw, from 100 ppmw to 300 ppmw, from 100 ppmw to 200 ppmw based on the total weight of the treatment fluid. When injecting as a slug, the treatment fluid may have a greater concentration of nanodots due to dilution of the treatment fluid by subsequent injection of seawater following injection of the slug. In embodiments, the treatment fluid comprising the carbon nanodots may be continuously injected over a period of time, such as for the injection duration, which may be greater than the time required for injection of a slug. When injected continuously, the treatment fluid comprising the carbon nanodots may have a more diluted concentration of carbon nanodots, such as a concentration of carbon nanodots of from 10 ppmw to 50 ppmw based on the total weight of the treatment fluids. The volume of the treatment fluid may be sufficient to cover several pore volumes of the subterranean formation near the injection well and lesser pore volumes as the treatment fluid progresses away from the injection well.

In embodiments, the injection duration, injection pressure, injection volume, or combinations of these may be sufficient to cause the carbon nanodots in the treatment fluid to penetrate into the formation to a distance from the injection well of greater than 10 meters, greater than or equal to 50 meters, greater than or equal to 100 meters, greater than or equal to 200 meters, or even greater than or equal to 500 meters.

Injecting the treatment fluid comprising the carbon nanodots dispersed in the brine solution from the injection well into the first subterranean formation may increase the hydrophilicity of rock in the first subterranean formation, the second subterranean formation or both. The treatment fluid comprising the carbon nanodots may decrease the oil wettability of the rock of the first subterranean formation, the second subterranean formation or both. Injection of the treatment fluid comprising the carbon nanodots of the present disclosure may increase the cumulative oil recovery from the first subterranean formation by greater than or equal to 10%, greater than or equal to 20%, or even greater than or equal to 30% compared to injection of a brine solution without the carbon nanodots.

In embodiments, the methods of enhancing recovery of hydrocarbons from a hydrocarbon-bearing subterranean formation may include injecting a brine solution into the second subterranean formation in a first treatment stage, injecting the treatment fluid comprising the carbon nanodots into the second subterranean formation in a second treatment stage after the first treatment stage, and injecting a surfactant solution in a third treatment stage after the second treatment stage. Alternatively, in embodiments, the methods of enhancing recovery of hydrocarbons from a hydrocarbon-bearing subterranean formation may include injecting a brine solution into the second subterranean formation in a first treatment stage, injecting a surfactant solution into the second subterranean formation in the second treatment stage after the first treatment stage, and injecting the treatment fluid comprising the carbon nanodots into the second subterranean formation in the third treatment stage after the second treatment stage. The brine solution of the first treatment stage may be seawater.

The methods of enhancing recovery of hydrocarbons from a hydrocarbon-bearing subterranean formation may further include preparing the treatment fluid comprising the carbon nanodots. Preparing the treatment fluid may include providing a brine solution having any of the features previously discussed for the brine solution and combining carbon nanodots with the brine solution to produce the treatment fluid. Preparing the treatment fluid comprising the carbon nanodots may further include mixing the brine solution and the carbon nanodots for a period of time sufficient to disperse and/or dissolve the carbon nanodots in the brine solution to produce the treatment fluid comprising the carbon nanodots. The methods of enhancing recovery of hydrocarbons from a hydrocarbon-bearing subterranean formation may include synthesizing the carbon nanodots. Synthesizing the carbon nanodots may be accomplished according to any of the methods of synthesizing the carbon nanodots described in the present disclosure.

In embodiments, the treatment fluid comprising the carbon nanodots may further include at least one surfactant. The at least one surfactant may include but is not limited to a cationic gemini surfactant, an anionic alpha olefin sulphonate surfactant, other surfactant, or combinations of surfactants. A suitable cationic gemini surfactant is described in Comparative Example 3 of the present disclosure. The treatment fluid may include from from 10 ppmw to 1,000 ppmw surfactant, or from 20 ppmw to 500 ppmw surfactant based on the total weight of the treatment fluid. The combination of the carbon nanodots and at least one surfactant in the treatment fluid for enhanced oil recovery provides a synergistic effect that unexpectedly results in the greater increase in the cumulative oil recovery from the hydrocarbon bearing subterranean formation compared to treatment fluids that include only the surfactant or only the carbon nanodots. Injecting the treatment that includes the combination of both the carbon nanodots and the at least one surfactant may increase the cumulative oil recovery of hydrocarbons from the first subterranean formation, the second subterranean formation, or both by greater than 50%, greater than 70%, or even greater than 100% compared to injecting a treatment fluid comprising a brine solution without the carbon nanodots or the surfactant. Injecting the treatment fluid comprising the combination of the carbon nanodots and the at least one surfactant may increase the cumulative oil recovery of hydrocarbons from the first subterranean formation, the second subterranean formation, or both by greater than 30%, greater than 40%, or even greater than 45% compared to injecting the treatment fluid comprising the carbon nanodots and no surfactant.

EXAMPLES

The various embodiments of the carbon nanodots and methods employing the carbon nanodots of the present disclosure will be further clarified by the following examples. The examples are illustrative in nature, and should not be understood to limit the subject matter of the present disclosure.

Example 1: Synthesis of Carbon Nanodots

In Example 1, the carbon nanodots of the present disclosure are synthesized. Hydrophilic carbon nanodots, for example, 3-8 nm in size are synthesized using citric acid and ethanolamine as a precursor. An initial mixture comprising citric acid and ethanolamine in a molar ratio of citric acid to ethanolamine of 1:3 was prepared. The initial mixture was prepared by dissolving the citric acid (citric acid monohydrate 99.5%) and the ethanolamine (99%) separately in fixed amounts of deionized water and then mixed together using a magnetic stirrer. The initial mixture was then heated to about 70° C. on a hot plate under constant stirring to evaporate the majority of the water from the initial mixture to produce a reaction mixture. When the reaction mixture became syrupy, the magnetic bar was removed and the reaction mixture was placed in a furnace and heated to 180° C. at a heating rate of 10 degrees Celsius per minute (° C./min). The reaction mixture was subjected to pyrolytic decomposition at 180° C. for 2 hours with no solvent present. The resulting black particulate product was allowed to cool to room temperature and purified using dialysis. The products are highly soluble/dispersible in water.

Example 2: Effects of Carbon Nanodots on Surface Wettability

In Example 2, the effects of the carbon nanodots of Example 1 were studied as a function of temperature, pressure, brine salinity, and particles concentration. Two Indiana limestone rock samples, in the shape of discs with the dimensions 2.521 centimeters (cm) in diameter and 0.356 cm in height were used as the substrates providing the surface. One sample was saturated with seawater (57,000 ppm Total Dissolved Solids (TDS)) and the other sample was saturated with "ARAB-D" crude oil. The petrophysical properties of the two core samples are provided in the following Table 1.

TABLE 1

Properties of Rock Samples for Example 2

| Rock Type | Thickness (cm) | Diameter (cm) | Pore Volume (mL) | Porosity (%) | Permeability (milliDarcies (mD)) | |
|---|---|---|---|---|---|---|
| | | | | | Gas (He) | Brine (sea water) |
| Indiana Limestone (carbonate) - seawater saturated | 0.356 | 2.521 | 0.343 | 19.11 | 256.28 | 221.0 |
| Indiana Limestone (carbonate) - crude oil saturated | 0.351 | 2.521 | 0.334 | 19.09 | 256.28 | 221.0 |

The pore volume, porosity, and permeability of the core samples in Table 1 were determined using an Automated Helium Porosimeter and Permeameter (APP-608). Each core sample was is placed inside the coreholder sleeves and a confining pressure of 500 psi is applied. Porosity is determined first, followed by permeability. The measurement of porosity is based on Boyle's Law which states that product of pressure and volume of an ideal gas at any constant temperature will always be constant. This principle is utilized to determine an unknown volume (pore volume) by expanding a gas (Helium) of known pressure and temperature condition into a void space of known volume. The physical dimensions of the core sample are used as input which provides the bulk volume and the ratio of the determined pore volume and bulk volume provides the porosity.

The gas or air permeability of the core sample is determined by the pulse decay method. This measurement works on the principle of transient analysis of pressure pulse decay in which gas permeability is determined as a function of gas (ideally helium) pressure decay. This equipment consists of a reference cell of known volume that charges the core sample with gas. A downstream valve vents the gas pressure, and pressure change as a function of time is recorded which is analyzed by the software to give a gas permeability of the core sample.

Liquid/brine permeability of a core sample is calculated by establishing a steady state flow of brine across the sample and recording the upstream and downstream pressures. In these Examples, each core sample was loaded in a core flooding apparatus and a confining pressure of 4500 psi was applied. The back pressure was held at about 3200 psi and brine was injected and the response monitored at different rates (e.g. 0.5 cc/min, 1 cc/min, and 2 cc/min). The steady state condition was monitored by ensuring that the inflow and outflow rates are identical. The difference of upstream and downstream pressures (delta P), the flow rate, and dimensions of the core samples were used to calculate the brine permeability using Darcy's law.

To evaluate the effects of the carbon nanodots on the wettability of the surface, both standard (i.e. static) and dynamic contact angle measurements were made at 298.15 degrees Kelvin (K) and atmospheric pressure for an oil droplet of the face of each of the rock samples. The static contact angle measurements demonstrated the effects of the carbon nanodots on wetting the surface and the dynamic contact angle measurements demonstrated the effect of the carbon nanodots on wettability change (dynamic) of an oil droplet on the face of a rock sample. Higher pressure and temperature experiments yielded similar results.

Static Contact Angle Measurements

Figure 3:
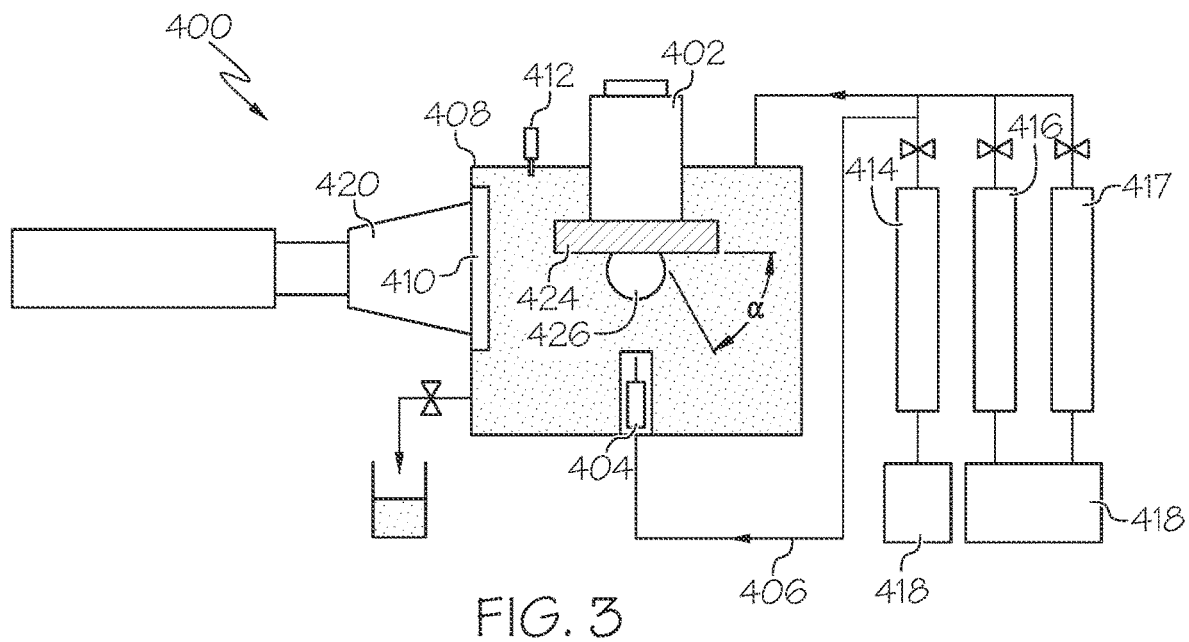
FIG. 3 schematically depicts an experimental setup for measuring contact angle of a crude oil droplet on a surface of a substrate submerged in a solution containing carbon nanodots, according to one or more embodiments shown and described in the present disclosure.

Now referring to FIG. 3, an experimental set-up 400, Interfacial Tension Meter (IFT-700, Vinci Tech), used for the measurement of contact angles in Example 2 is schematically depicted. The contact angle measurements are made using the invert sessile drop method. The experimental set-up 400 included a sample holder 402, syringe 404 loaded with crude oil 406, fluid cell 408 with a sapphire glass window 410, a thermostat 412 for temperature control, an oil accumulator 414 for oil storage, a brine accumulator 416 for brine storage, pumps 418 for pressure control and a high-resolution digital camera 420 for image capture and analysis. First, the fluid cell 408 is filled with the brine solution 422. The rock sample 424 (either water or oil saturated) may be then mounted on the sample holder 402 on top of the fluid cell 408 and immersed in the brine solution. The brine solution 422 comprised seawater (57,000 ppm TDS). The system is left to equilibrate for 30-60 minutes. After equilibration of the rock sample 424 in the brine solution 422, an oil droplet 426 may be released from the syringe 404 bottom of the fluid cell 408 into the brine solution 422. The oil droplet 426 may be then allowed to stabilize for 15-30 minutes on the surface of the rock sample 424 before the contact angle θ (theta) is measured. The contact angle is measured by capturing a digital image of the oil droplet 426 using the high-resolution digital camera 420, and calculating the contact angle (theta) using a computing device and image analysis software. The contact angle (theta) is defined as the angle between the surface of the rock sample 424 and a line tangent to the outer surface of the oil droplet 426 at the point where the oil droplet 426 contacts the surface of the rock sample 424.

Figure 4A:
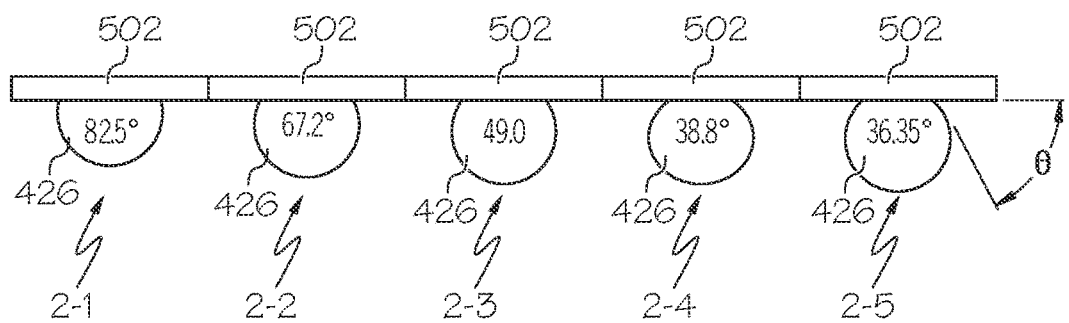
FIG. 4A schematically depicts static contact angle measurements of crude oil droplets on a surface of a water saturated rock sample at different concentrations of carbon nanodots in a solution in which the rock sample is submerged, according to one or more embodiments shown and described in the present disclosure.
Figure 4B:
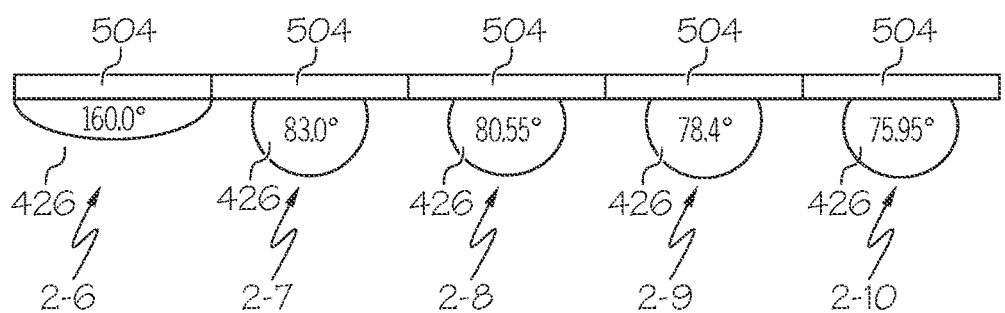
FIG. 4B schematically depicts static contact angle measurements of crude oil droplets on a surface of a crude oil saturated rock sample at different concentrations of carbon nanodots in a solution in which the rock sample is submerged, according to one or more embodiments shown and described in the present disclosure.

Referring now to FIGS. 4A and 4B, a diagram of the oil droplets 426 on the surface of the rock sample at different concentrations of carbon nanodots in the brine solution is schematically depicted for both the seawater saturated rock sample 502 (FIG. 4A) and the crude oil saturated rock sample 504 (FIG. 4B) of Example 2 at 298.15 K and 14.7 pounds per square inch. The results of the contact angle (theta) for the oil droplet 426 as a function of the concentration of carbon nanodots in the brine solution are provided in the following Table 2. The concentration of nanodots is given in weight percent (wt. %) and in parts per million by weight (ppmw).

TABLE 2

Static Contact Angle Measurements for Example 2

| Sample # | Sample Type | Saturate Type | Carbon Nanodot Concentration | | Contact Angle | Change* |
|---|---|---|---|---|---|---|
| | | | wt. % | ppmw | (degrees) | (%) |
| 2-1 | Comparative | Seawater | 0 | 0 | 82.5 | — |
| 2-2 | Example | Seawater | 0.001 | 10 | 67.2 | −18.6 |
| 2-3 | Example | Seawater | 0.005 | 50 | 49.0 | −40.6 |
| 2-4 | Example | Seawater | 0.020 | 200 | 38.8 | −53.0 |
| 2-5 | Example | Seawater | 0.050 | 500 | 36.6 | −55.6 |
| 2-6 | Comparative | Crude Oil | 0 | 0 | 160.0 | — |
| 2-7 | Example | Crude Oil | 0.001 | 10 | 83.0 | −48.1 |
| 2-8 | Example | Crude Oil | 0.005 | 50 | 80.6 | −49.6 |
| 2-9 | Example | Crude Oil | 0.020 | 200 | 78.4 | −51.0 |
| 2-10 | Example | Crude Oil | 0.050 | 500 | 76.0 | −52.5 |

Referring again to FIG. 4A, the seawater saturated rock sample 502 of sample 2-1, which was a comparative example, exhibited neutral wet properties in seawater with no carbon nanodots. Neutral wet properties correspond to static contact angles around 90 degrees. When the contact angle is greater than 90 degrees, the rock sample is considered to exhibit more oil wet properties, and when the contact angle is less than 90 degrees, the rock sample is considered to exhibit more water wet properties. The presence of the carbon nanodots in samples 2-2 through 2-5 caused the wettability to shift strongly to water wet. As shown in FIG. 4A and the data in Table 2, the shift to water wettability was shown to increase with increasing concentration of carbon nanodots in the brine solution. As shown in Table 2 above, adding the carbon nanodots to the brine solution in concentrations of from 10 ppmw to 500 ppmw can reduce the static contact angle by from 18.6% to 55.6%, which indicates an increase in water wettability and a decrease in oil wettability.

Referring again to FIG. 4B, the crude oil saturated rock sample 504 of sample 2-6, which was also a comparative example, exhibited oil-wet properties in seawater with no carbon nanodots, as shown by the static contact angle of 160 degrees. The presence of the carbon nanodots in samples 2-7 through 2-10 caused the wettability to shift to neutral wet or even slightly water wet, as indicated by the decrease in the contact angle from 160 degrees for comparative example 2-6 to 83 degrees for example 2-7 and even down to 76 degrees for example 2-10. As shown in FIG. 4B and the data in Table 2, the shift from oil wettability to neutral and water wettability was shown to increase with increasing concentration of carbon nanodots in the brine solution. As shown in Table 2 above, adding the carbon nanodots to the brine solution in concentrations of from 10 ppmw to 500 ppmw can reduce the static contact angle by from 48% to 52.5%, which indicates the surface of the crude oil saturated rock sample 504 becoming more hydrophilic with increasing carbon nanodot concentration. In particular, even the addition of 10 ppmw carbon nanodots to the brine solution reduced the contact angle by 48%, indicating a shift in the surface from oil wettability to neutral or even slightly water wet.

Dynamic Contact Angle Measurements

A dynamic wettability study was performed on a crude oil saturated rock sample 504 using the experimental set-up previously described in Example 2. The dynamic contact angle study was performed at a temperature of 298.15 K and 14.7 psi (101.35 kilopascals or atmospheric pressure). Initially, the crude oil saturated rock sample 504 was immersed in the brine solution (seawater (57,000 ppm TDS)) with no carbon nanodots, and the oil droplet was released to rest on the face of the rock (identical to the static setup). The system was allowed to equilibrate for 24 hours before measuring the contact angle. Afterwards, a new brine solution having an increased concentration of the carbon nanodots was introduced to substitute the fluid in the fluid cell and the contact angle was measured after a 24-hour period for each new concentration of carbon nanodots. The contact angles are shown graphically in FIG. 5 and provided numerically in Table 3.

TABLE 3

Dynamic Contact Angle as a Function of Concentration of Carbon Nanodots

| Sample # | Sample Type | Saturate Type | Carbon Nanodot Concentration | | Contact Angle | Change* |
|---|---|---|---|---|---|---|
| | | | wt. % | ppmw | (degrees) | (%) |
| 2-11 | Comparative | Crude oil | 0 | 0 | 160.0 | — |
| 2-12 | Example | Crude oil | 0.005 | 50 | 147.3 | −7.9 |
| 2-13 | Example | Crude oil | 0.0075 | 75 | 141.5 | −11.6 |
| 2-14 | Example | Crude oil | 0.010 | 100 | 137.5 | −14.1 |
| 2-15 | Example | Crude oil | 0.030 | 300 | 125.4 | −21.6 |

Figure 5:
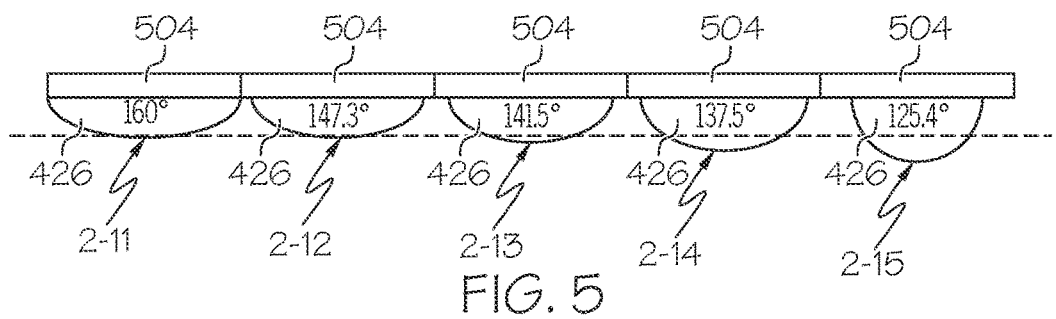
FIG. 5 schematically depicts dynamic contact angle measurements of crude oil droplets on a surface of a crude oil saturated rock sample at different concentrations of carbon nanodots in a solution in which the rock sample is submerged, according to one or more embodiments shown and described in the present disclosure.

Referring to FIG. 5, an example diagram of the results of the effect of the different concentrations of the CND on the dynamic contact angle measurement of the crude oil rock sample rock (oil saturated)-seawater system is provided. As shown in FIG. 5 and in Table 3, increasing the concentration of carbon nanodots in the brine solution reduces the degree to which the surface of the crude-oil saturated rock sample 504 is oil wet. In other words, the greater the concentration of carbon nanodots in the brine solution, the lesser oil-wet the surface of the rock sample becomes. This effect is emphasized clearly with an increase in the wedging effect on the oil droplet 426 as a function of the nanodots concentration, as shown in FIG. 5.

Figure 6:
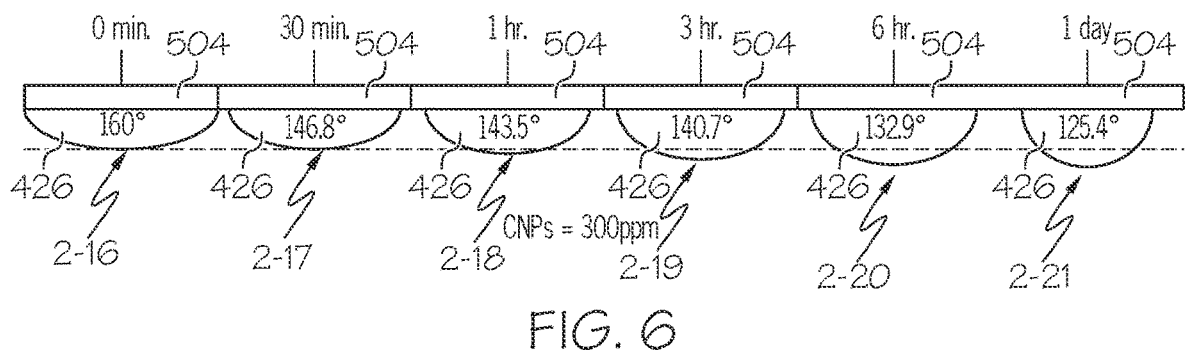
FIG. 6 schematically depicts dynamic contact angle measurements of crude oil droplets on a surface of a crude oil saturated rock sample at different durations of time after contact with the surface for a fixed concentration of carbon nanodots, according to one or more embodiments shown and described in the present disclosure.

In a second dynamic contact angle study, the crude oil saturated rock sample 504 was immersed in a brine solution comprising no carbon nanodots. The oil droplet 426 was released to contact the surface of the crude oil saturated rock sample 504, and the system was allowed to equilibrate for 24 hours. The initial contact angle of the oil droplet 426 in the brine solution was measured (time equal to 0 (zero)). Afterwards, a brine solution comprising 300 ppmw carbon nanodots was introduced to the fluid cell to replace the initial brine solution, and the contact angle was measured at time equal to 0.5 hours, 1 hour, 3 hours, 6 hours, and 24 hours. The dynamic contact angle measurements at each time is provided graphically in FIG. 6 and numerically in Table 4. As shown in FIG. 6 and Table 4, the contact angle decreases with increasing time exposure to the brine solution comprising 300 ppmw carbon nanodots, which indicates that the wettability of the surface of the crude oil saturated rock sample 504 decreases in oil wettability as the exposure time to the brine solution with the carbon nanodots increases.

TABLE 4

Dynamic Contact Angle Measurements As a Function of Exposure Time

| Sample # | Sample Type | Saturate Type | Carbon Nanodot Conc (ppmw) | Exposure Time (hours) | Contact Angle (degrees) | Change* (%) |
|---|---|---|---|---|---|---|
| 2-16 | Comparative | Crude oil | 300 | 0 | 160.0 | — |
| 2-17 | Example | Crude oil | 300 | 0.5 | 146.8 | −8.3 |
| 2-18 | Example | Crude oil | 300 | 1 | 143.5 | −10.3 |
| 2-19 | Example | Crude oil | 300 | 3 | 140.7 | −12.1 |
| 2-20 | Example | Crude oil | 300 | 6 | 132.9 | −16.9 |
| 2-21 | Example | Crude Oil | 300 | 2424 | 125.4 | −21.6 |

Comparative Example 3: Cationic Gemini Surfactant

In Comparative Example 3, a cationic gemini surfactant was synthesized. The cationic gemini surfactant was synthesized according to the methods disclosed in Hussain, S. S., Kamal, M. S., Fogang, L. T. and Patil, S., "Effect of the number of ethylene oxide units on the properties of synthesized tailor-made cationic gemini surfactants for oilfield applications" JOURNAL OF MOLECULAR STRUCTURE, 1196, (2019) pp. 851-860, the entire contents of which are incorporated by referene in the present disclosure. The cationic gemini surfactant was used as a standard to evaluate the efficiency of carbon nanodots for use in enhanced oil recovery processes.

Comparative Example 4: Anionic Alpha Olefin Sulfonate (AOS) Surfactant

An anionic alpha olefin sulfonate (AOS) surfactant was also included in the study for comparison. The alpha olefin sulfonate (AOS) surfactant was sodium alpha-olefin (C14-16) sulfonate (CAS No.: 68439-57-6—sulfonic acids, C14-16-alkane hydroxy and C14-16-alkene, sodium salts) obtained from Al-Biariq Petrochemical.

Examples 5 and 6: Coreflood Experiments

In Examples 5 and 6, treatment fluids comprising the carbon nanodots were evaluated for use in enhanced oil recovery processes by conducting coreflood studies. The core samples used in the coreflood experiments were Indiana limestone (carbonate rock) cores, the properties of which are provided in Table 5. The core samples were initially saturated with formation water (220,000 ppm in TDS) under vacuum. The saturated core samples were then de-saturated (using either the porous plate or centrifuge methods) to measure the irreducible water saturation. The core samples were then re-saturated with Arab-D crude oil and aged for 2 weeks at 100° C.

Figure 8:
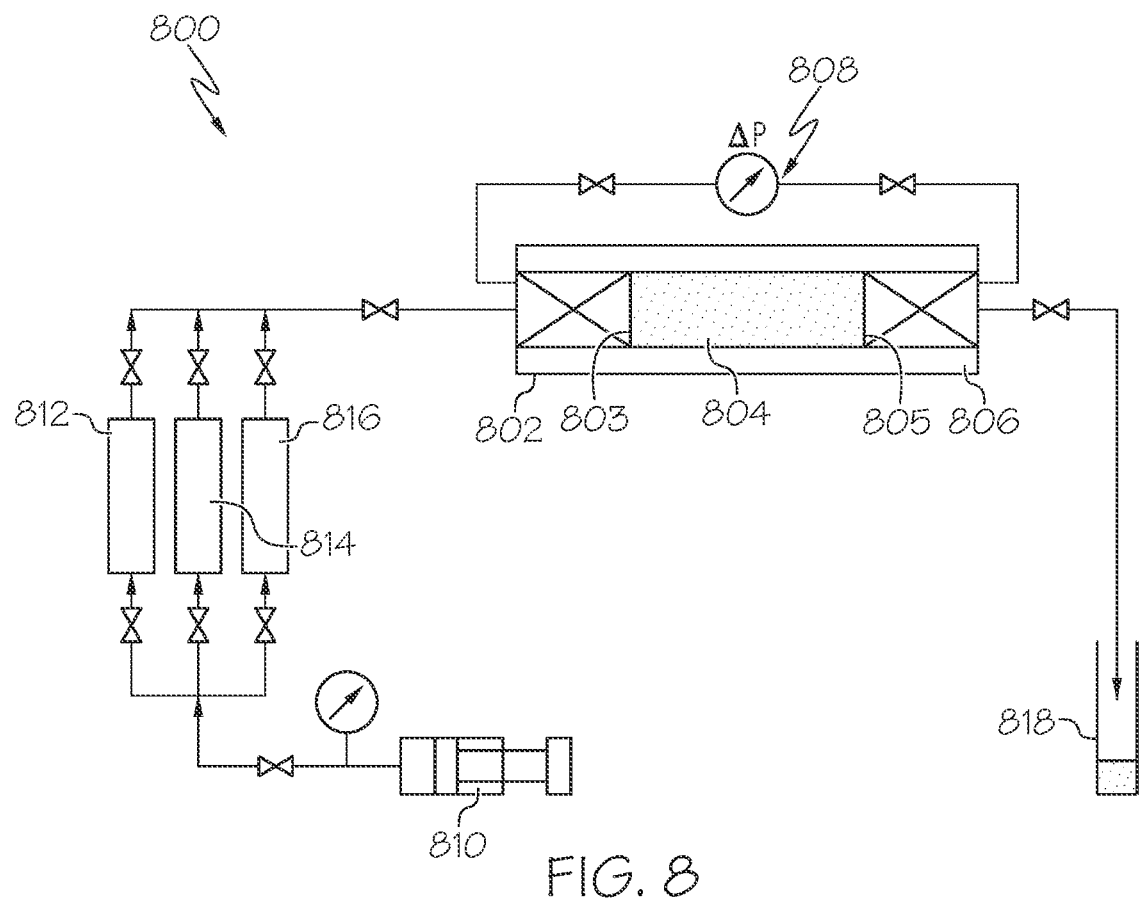
FIG. 8 schematically depicts an experimental setup for conducting coreflood experiments on core samples, according to one or more embodiments shown and described in the present disclosure.

Referring now to FIG. 8, the coreflood experimental system 800 for conducting the coreflood experiments of Example 5 is schematically depicted. The coreflood experimental system 800 includes a core holder 802 operable to hold the core sample 804 and direct a fluid pass longitudinally through the core sample 804 from the upstream end 803 to the downstream end 805. The core holder 802 may include a confining fluid 806 that may be operable to maintain the core sample at a simulated downhole operating pressure and to prevent the fluids directed into the core sample 804 from passing radially outward out of the core sample 804. The core holder 802 may include a pressure regulation system 808 operable to regulate the pressure of the core sample 804. The coreflood experimental system 800 may also include a high-pressure pump 810, a brine solution accumulator 812, a carbon nanodot solution accumulator 814, a surfactant accumulator 816, and a fraction collector 818 as depicted in FIG. 8.

The brine solution (seawater having 57,500 ppm TDS), a carbon nanodot solution (200 ppmw carbon nanodots in seawater), and a surfactant solution (200 ppmw cationic gemini surfactant in seawater) were placed into each of the brine solution accumulator 812, the carbon nanodot solution accumulator 814, the surfactant accumulator 816, respectively. The oil-saturated core sample 804 was subjected to an overburden pressure of 4,500 psi (31,026 kPa) and a pore pressure of 3,200 psi (22,063 kPa) and was heated to 100° C.

For Example 5, a brine solution flood was first applied to the saturated core sample at a rate of 0.1 cubic centimeters per minute (cc/min) and the fractions recovered from the core sample 804 collected in the fraction collector 818. The brine solution flood was continued for 2 to 3 times the pore volume of the core samples (2-3 PV) until the water-cut exceeded 95% or oil production is no more registrable.

For Example 5, the feed was changed over to the carbon nanodot solution in a second coreflood stage. In the second stage, the flood of carbon nanodot solution was applied to the saturated core sample at a rate of 0.1 cc/min and was continued (for 2-3 PV) until the water-cut exceeded 95% or oil production is no more registrable. In a third stage, the feed was changed over to the surfactant solution comprising the cationic gemini surfactant in seawater. In the third stage, the flood of surfactant solution was applied to the saturated core sample at a rate of 0.1 cc/min and was continued (for 2-3 PV) until the water-cut exceeded 95% or oil production is no more registrable. The petrophysical properties of the core samples and the oil recovery for Example 5 is provided in Table 5.

For Example 6, the feed was changed over to the surfactant solution in the second coreflood stage. In the second coreflood stage, the flood of surfactant solution was applied to the saturated core sample at a rate of 0.1 cc/min and was continued (for 2-3 PV) until the water-cut exceeded 95% or oil production is no more registrable. In the third stage, the feed was changed over to the carbon nanodot solution comprising the carbon nanodots in seawater. In the third stage, the flood of carbon nanodot solution was applied to the saturated core sample at a rate of 0.1 cc/min and was continued (for 2-3 PV) until the water-cut exceeded 95% or oil production is no more registrable. The petrophysical properties of the core samples and the oil recovery for Example 6 is also provided in Table 5. The effects of differences in pore volume, porosity, and permeability between the core samples of Examples 5 and 6 are negligible.

TABLE 5

| Property | Example 5 | Example 6 |
|---|---|---|
| Core Length (cm) | 8.999 | 9.404 |
| Core Diameter (cm) | 3.736 | 3.781 |
| Pore Volume (cc) | 20.557 | 21.403 |
| Porosity (%) | 18.54 | 19.14 |
| Gas Permeability (He in mD) | 106.62 | 142.44 |
| Oil Permeability (mD) | 18.22 | 22.41 |
| *OOIP(cm$^3$) | 15.33 | 13.71 |
| $S_{oi}$ (%) (initial oil saturation) | 74 | 65 |
| $S_{wi}$ (%) (initial water saturation) | 26 | 35 |
| Oil Recovery (%) Based on Original Oil In Place (OOIP) | | |
| Stage 1 Flood | Seawater | Seawater |
| Stage 1 Oil Recovery (%) | 40.57 | 35.09 |
| Stage 2 Flood | Carbon Nanodot Solution | Surfactant Solution |
| Stage 2 Oil Recovery (%) | 19.89 | 10.94 |
| Stage 3 Flood | Surfactant Solution | Carbon Nanodot Solution |
| Stage 3 Oil Recovery (%) | 9.19 | 17.54 |
| Cumulative Oil Recovery (%) | 69.65 | 63.57 |

*OOIP refers to the original oil in-place in the core sample.

As shown in Table 5, the carbon nanodot solution comprising 200 ppmw carbon nanodots in seawater provided greater oil recovery in the second stage (19.89% original oil in place (OOIP) for Example 5) compared to the oil recovery obtained by the surfactant solution (10.94% OOIP for Example 6). The carbon nanodot solution also provided greater oil recovery in the third stage compared to the oil recovery obtained by using the surfactant solution in the third stage. The cumulative oil recovery of 69.65% OOIP using the carbon nanodot solution in the second stage as in Example 5 was greater than the cumulative oil recovery of 63.57% OOIP obtained when the surfactant solution was used in the second stage as in Example 6.

Figure 9:
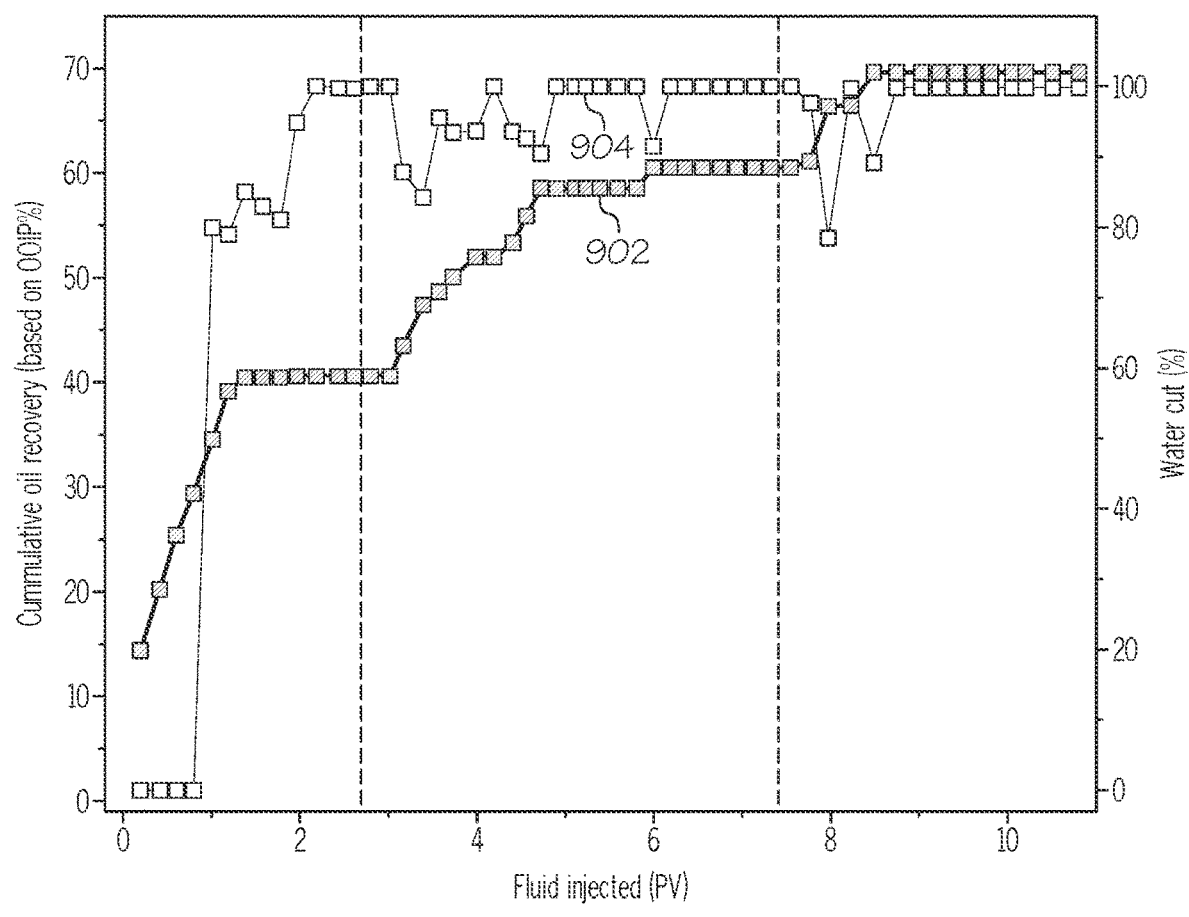
FIG. 9 graphically depicts cumulative oil recovery (y-axis left) and water cut (y-axis right) as functions of a volume of a treatment fluid (x-axis) injected in a core sample for the experiment of Example 5, according to one or more embodiments shown and described in the present disclosure.
Figure 10:
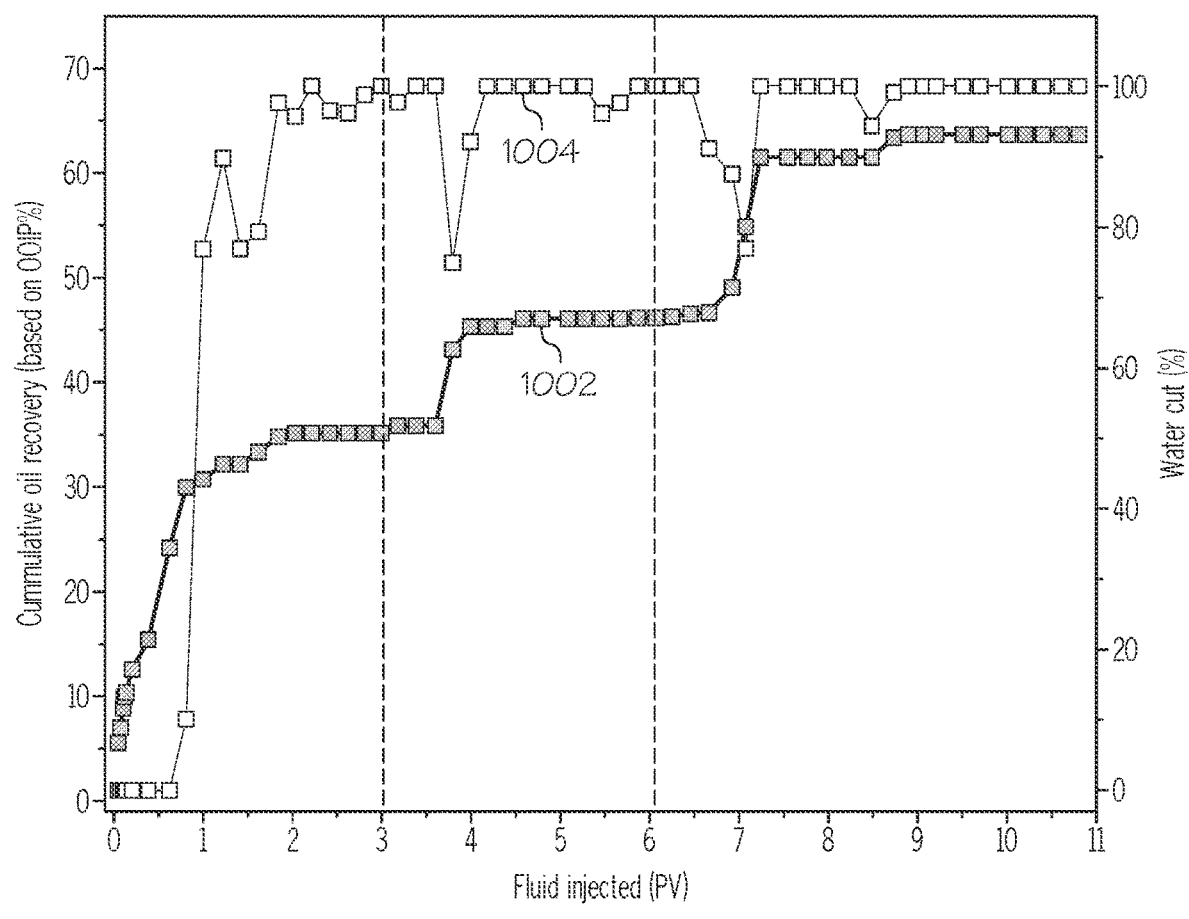
FIG. 10 graphically depicts cumulative oil recovery (y-axis left) and water cut (y-axis right) as functions of a volume of a treatment fluid (x-axis) injected in a core sample for the experiment of Example 6, according to one or more embodiments shown and described in the present disclosure.

FIGS. 9 and 10 graphically depict the additive effect of carbon nanodots and the gemini surfactant floods on oil recovery performance over seawater flooding. Referring to FIG. 9, the cumulative oil recovery (% OOIP—reference number 902) and water cut (%—reference number 904) are graphically depicted as functions of the volume of fluid injected through all three stages for Example 5, for which the first stage comprised seawater, the second stage comprised the carbon nanodot solution, and the third stage comprised the surfactant solution. The volume of fluid injected in FIGS. 9 and 10 are given in units of pore volume, where 1 pore volume is equal to the total pore volume of the rock sample from table 5. As shown in FIG. 9, the coreflood pattern of Example 5 yielded approximately 40%-60%-70% in cumulative oil recoveries for SW-CND-Surfactant flood series.

Referring to FIG. 10, the cumulative oil recovery (% OOIP—reference number 1002) and water cut (%—reference number 1004) are graphically depicted as functions of the volume of fluid injected through all three stages for Example 6, for which the first stage comprised seawater, the second stage comprised the surfactant solution, and the third stage comprised the carbon nanodot solution. As shown in FIG. 10, the coreflood pattern of Example 6 yielded approximately 35%-45%-65% in cumulative oil recoveries for the SW-Surfactant-CND flood series. In both cases (Examples 5 and 6), the carbon nanodot solution flood generated about 20% additional oil recovery whereas the surfactant generated only about 10% additional oil recovery as a percentage of OOIP. Thus, treating subterranean formation with treatment fluids containing carbon nanodots according to the present disclosure during enhanced oil recovery processes may increase the cumulative oil recovery from the formation compared to using treatment fluids comprising surfactants only.

Examples 7-18: Imbibition Experiments

In Examples 7-18, treatment fluids comprising the carbon nanodots were evaluated for use in enhanced oil recovery processes against seawater and a surfactant solution by conducting imbibition studies to assess the ability of the carbon nanodots to release crude oil from the pores of core samples. Indiana limestone core samples (carbonate rock) having dimensions of 2 inches in length and 1.5 inches in diameter were used for the imbibition experiments.

Figure 11:
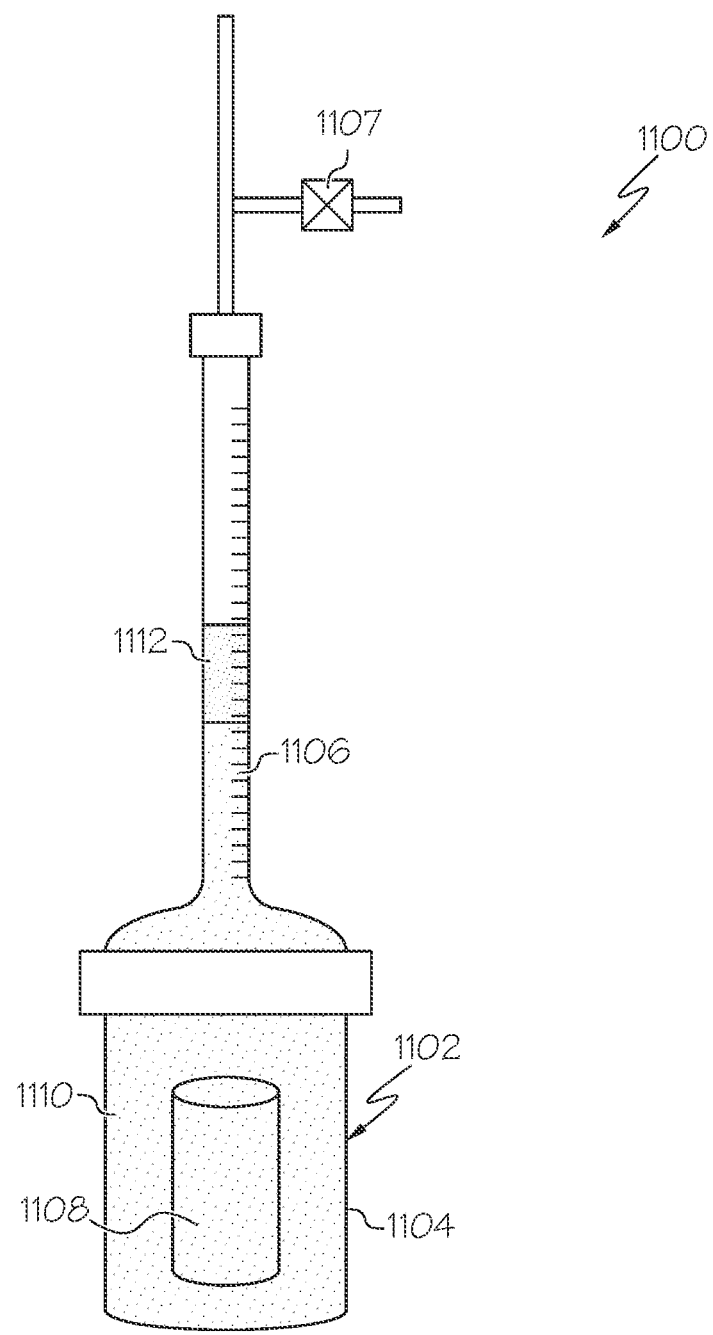
FIG. 11 schematically depicts an Amott cell experimental setup for conducting imbibition experiments on core samples, according to one or more embodiments shown and described in the present disclosure.

Referring now to FIG. 11, the imbibition experimental setup 1100 for the spontaneous imbibition experiments is schematically depicted. The imbibition experimental setup 1100 comprised a high temperature Amott cell 1102 for conducting the spontaneous imbibition experiments. The Amott cell 1102 included a vessel 1104, a graduated tube 1106 fluidly coupled to the vessel 1104, and a pressure relief valve 1107. The pressure relief valve 1107 was configured to relieve pressure from the Amott cell 1102 at a threshold pressure of 30 psi. During the experiment, a core sample 1108 is placed in the Amott cell 1102, and the imbibing solution 1110 is added.

All the core samples 1108 were initially saturated with formation water (220,000 ppm in TDS) under vacuum. These were then de-saturated (using either the porous plate or centrifuge methods) to measure the irreducible water saturation, and then re-saturated with Arab-D crude oil. For Examples 7-12, the crude oil saturated core samples 1108 were immediately evaluated in the imbibition experiments with no aging. For Examples 13-18 each of the crude oil saturated core samples 1108 were aged for 2 weeks at 100° C.

For the imbibition experiments, the each crude oil saturated core sample 1108 was placed into an Amott cell 1102, and the Amott cell 1102 was filled with corresponding imbibing fluids 1110 (e.g. seawater, carbon nanodots in seawater, surfactant in seawater, or combined nanodot and surfactant in seawater). The Amott cell was maintained at a temperature of 100° C. The seawater used to prepare the imbibing fluids had a TDS of 57,500 ppm. The imbibing fluids and concentrations of carbon nanodots, surfactant, or both for each of Examples 7-18 are provided in Table 6. Examples 7-9 and 13-15 are comparative examples. The crude oil 1112 released from the core sample 1108 as a result of contact with the imbibing fluid 1110 collected in the graduated tube 1106 coupled to the vessel 1102 and the total volume of the crude oil 1112 was measured.

imbibition performance comparable to existing surfactant-based treatment solutions, while additionally propagating further into the formation than conventional surfactant solutions.

Figure 12:
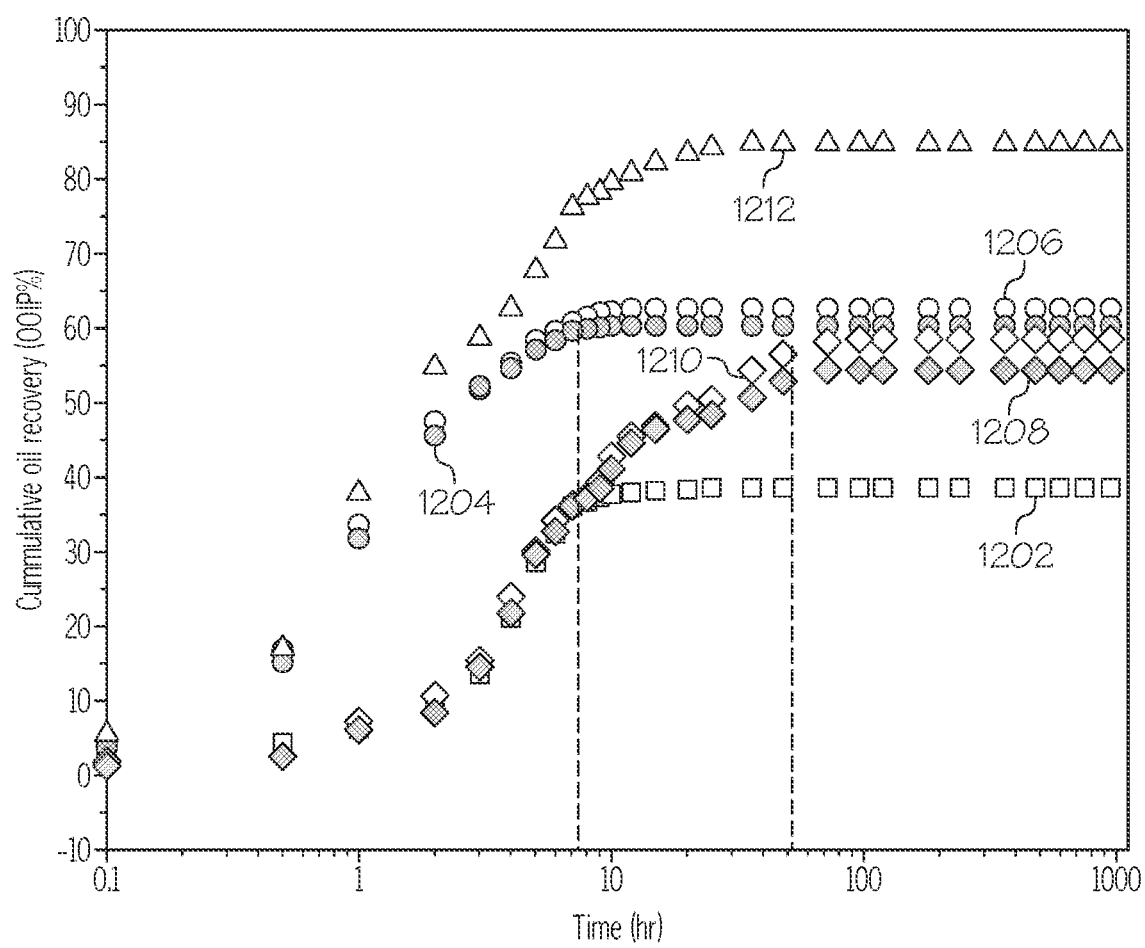
FIG. 12 graphically depicts cumulative oil recovery (y-axis) as a function of time (x-axis) for fluid imbibition experiments using non-aged core samples saturated with crude oil, according to one or more embodiments shown and described in the present disclosure.

FIG. 12 also illustrates the synergistic effects of combining both carbon nanodots and the cationic gemini surfactant in a treatment fluid. For Example 12 (ref. no. 1212 in FIG. 12), which included 200 ppm carbon nanodots of Example 1 and 200 ppm cationic gemini surfactant of Comparative Example 3, the treatment fluid comprising the carbon nan-

TABLE 6

Results of Imbibition Experiments

| Example Number | 7 | 8 | 9 | 10 | 11 | 12 |
|---|---|---|---|---|---|---|
| Example Type | Comp. Ex. | Comp. Ex. | Comp. Ex. | Example | Example | Example |
| Reference No. FIG. 12 | 1202 | 1204 | 1206 | 1208 | 1210 | 1212 |
| Aged | No | No | No | No | No | No |
| Surfactant | None | Comp. Ex. 3 | Comp. Ex. 3 | None | None | Comp. Ex. 3 |
| Surfactant Conc. (ppmw) | 0 | 200 | 500 | 0 | 0 | 200 |
| Carbon Nanodot Conc. (ppmw) | 0 | 0 | 0 | 200 | 500 | 200 |
| Core Sample Length (cm) | 5.070 | 8.083 | 5.071 | 5.097 | 5.076 | 5.070 |
| Core Sample Diameter (cm) | 3.734 | 3.758 | 3.752 | 3.721 | 3.750 | 3.832 |
| Pore Volume (cm$^3$) | 12.11 | 10.79 | 11.59 | 12.23 | 12.32 | 11.03 |
| Porosity (%) | 19.87 | 19.14 | 20.11 | 20.27 | 20.14 | 18.87 |
| Gas Permeability (He) (mD) | 333.75 | 256.28 | 345.26 | 475.91 | 369.95 | 420.32 |
| Oil Permeability (mD) | 91.11 | 88.87 | 138.56 | 167.23 | 141.11 | 153.00 |
| $S_{oi}$ (%) | 66.31 | 72.84 | 71.52 | 67.54 | 67.63 | 69.33 |
| $S_{wi}$ (%) | 33.69 | 27.16 | 28.48 | 32.46 | 32.37 | 30.67 |
| OOIP (cm$^3$) | 8.03 | 7.86 | 8.29 | 8.26 | 8.33 | 7.65 |
| Oil Recovery (cm$^3$) | 3.1 | 4.75 | 5.2 | 4.5 | 4.9 | 6.5 |
| Oil Recovery (% OOIP) | 38.60 | 60.44 | 62.73 | 54.48 | 58.81 | 84.99 |

| Example Number | 13 | 14 | 15 | 16 | 17 | 18 |
|---|---|---|---|---|---|---|
| Example Type | Comp. Ex. | Comp. Ex. | Comp. Ex. | Example | Example | Example |
| Reference No. FIG. 13 | 1302 | 1304 | 1306 | 1308 | 1311 | 1312 |
| Aged | 2 weeks | 2 weeks | 2 weeks | 2 weeks | 2 weeks | 2 weeks |
| Surfactant | None | Comp. Ex. 3 | Comp. Ex. 4 | None | None | None |
| Surfactant Conc. (ppmw) | 0 | 200 | 200 | 0 | 0 | 0 |
| Carbon Nanodot Conc. (ppmw) | 0 | 0 | 0 | 50 | 100 | 200 |
| Core Sample Length (cm) | 5.101 | 5.078 | 5.100 | 5.104 | 5.099 | 5.068 |
| Core Sample Diameter (cm) | 3.731 | 3.739 | 3.73 | 3.731 | 3.731 | 3.748 |
| Pore Volume (cm$^3$) | 9.8656 | 10.5 | 10.2 | 10.2 | 10.4 | 10.9 |
| Porosity (%) | 17.69 | 18.84 | 18.54 | 18.5 | 18.8 | 19.5 |
| Gas Permeability (He) (mD) | 202.43 | 307.61 | 278.52 | 303.56 | 298.81 | 312.72 |
| Oil Permeability (mD) | 26.58 | 30.18 | 26.88 | 28.58 | 29.52 | 31.55 |
| $S_{oi}$ (%) | 73.29 | 78.06 | 71.37 | 80.20 | 79.13 | 75.6 |
| $S_{wi}$ (%) | 26.72 | 21.94 | 28.63 | 19.8 | 20.87 | 24.33 |
| OOIP (cm$^3$) | 7.23 | 8.2 | 7.28 | 8.18 | 8.23 | 8.25 |
| Oil Recovery (cm$^3$) | 3 | 4.8 | 3.8 | 3.82 | 4.25 | 5.7 |
| Oil Recovery (% OOIP) | 41.49 | 58.54 | 52.20 | 46.70 | 51.64 | 69.09 |

Referring now to FIG. 12, effect of using different fluids in varying concentrations on the cumulative oil recovery in the spontaneous imbibition experiments for the non-aged core samples of Examples 7-12 are graphically depicted. In FIG. 12, the cumulative oil recovery (y-axis—% OOIP) is graphically depicted as a function of time (x-axis—hours). As shown in FIG. 12, carbon nanodot solutions of Examples 10 and 11 (ref. nos. 1208 and 1210 in FIG. 12) provided superior imbibition performance compared to treatment with seawater alone, as in Comparative Example 7 (ref. no. 1202). At ten hours, the cumulative oil recovery for Examples 10 and 11 comprising the carbon nanodots was 50% greater than the cumulative oil recovery for Comparative Example 7 (seawater only). The oil recovery performance of the carbon nanodot solutions of Examples 10 and 11 provided imbibition performance slightly less than but comparable to the surfactant solutions of Comparative Examples 8 and 9 (ref. nos. 1204 and 1206). Thus, the nanodot solutions of the present disclosure may provide odots and gemini surfactant exhibited over 85% OOIP cumulative oil recovery during the imbibition experiment and achieved greater than 60% OOIP in less time compared to the treatment fluids of Comparative Examples 8 and 9 and Examples 10 and 11. In particular, the treatment fluid of Example 12 having 200 ppmw carbon nanodots and 200 ppmw surfactant resulted in a 35% increase in cumulative oil recovery compared to the solution of Comparative Example 9, which included 500 ppmw surfactant. This synergistic effect of combining the carbon nanodots and the cationic gemini surfactant is unexpected. This is unexpected because the surfactant solutions of Comparative Example 9 showed slightly better performance than the carbon nanodots solutions of Examples 10 and 11. Thus, one would expect reducing the surfactant amount by 300 ppmw and adding 200 ppmw carbon nanodots to result in the same or slightly reduced oil recovery based on the results for Comparative Examples 8 and 9 and Examples 10 and 11. However, this was not observed. Instead, the combination of the carbon nanodots and surfactant in Example 12 exhibited synergistic effects that greatly improved the cumulative oil recovery in the imbibition experiments, as previously discussed.

Figure 13:
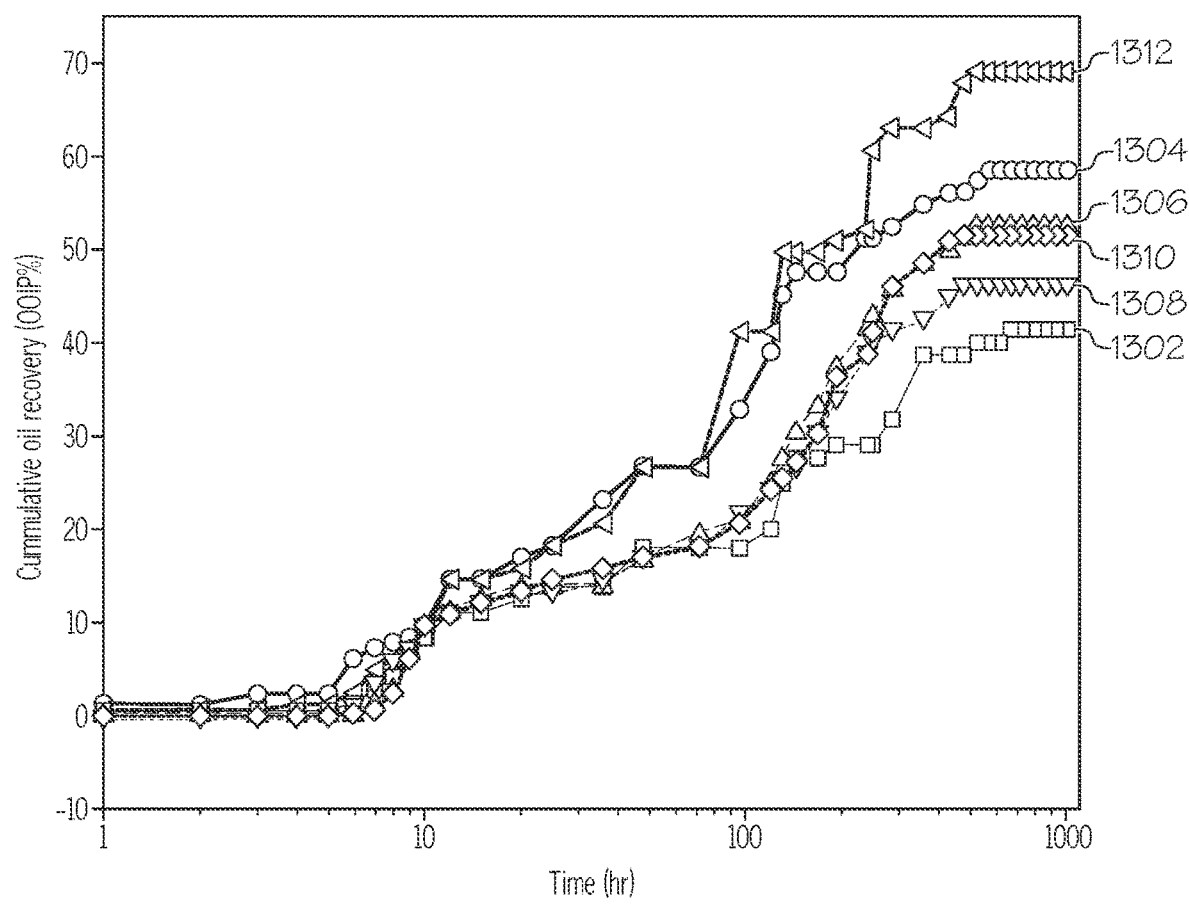
FIG. 13 graphically depicts cumulative oil recovery (y-axis) as a function of time (x-axis) for fluid imbibition experiments using core samples saturated with crude oil and aged for two weeks prior to the imbibition experiments, according to one or more embodiments shown and described in the present disclosure.

Referring now to FIG. 13, effect of using different fluids in varying concentrations on the cumulative oil recovery in the spontaneous imbibition experiments for the core samples of Examples 13-18, which were aged for 2 weeks, are graphically depicted. In FIG. 13, the cumulative oil recovery (y-axis—% OOIP) is graphically depicted as a function of time (x-axis—hours). As shown in FIG. 13, carbon nanodot solutions of Examples 16-18 (ref. nos. 1308, 1310, and 1312 in FIG. 13) provided superior imbibition performance compared to treatment with seawater alone, as in Comparative Example 13 (ref. no. 1302). Thus, the treatment solutions comprising the carbon nanodots of the present disclosure provide superior oil recovery performance compared to treatment with seawater alone.

Referring again to FIG. 13, the treatment solution of Example 17 having 100 ppmw carbon nanodots provided cumulative oil recovery performance in the imbibition experiments comparable to the treatment solution of Comparative Example 15, which included 200 ppm anionic AOS surfactant of Comparative Example 4, in seawater. Thus, a treatment fluid having a lesser concentration of carbon nanodots (as in Example 17) can provide greater oil recovery performance compared to treatment fluids having greater concentration of AOS surfactants. Additionally, the treatment solution of Example 18 having 200 ppmw carbon nanodots of the present disclosure provided better cumulative oil recovery performance in the imbibition experiments compared to the treatment solutions of both Comparative Example 14 (200 ppmw gemini surfactant in seawater) and Comparative Example 15 (200 ppmw AOS surfactant in seawater. Thus, treatment fluids with f carbon nanodots provide superior cumulative oil recovery from aged core samples compared to the treatment solutions having equivalent amounts of surfactants.

It is noted that one or more of the following claims utilize the terms "where," "wherein," or "in which" as transitional phrases. For the purposes of defining the present technology, it is noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A method for modifying surface wettability of a surface of a solid substrate, the method comprising contacting the surface of the solid substrate with a brine solution comprising carbon nanodots, where:
   the carbon nanodots comprise carbon, oxygen, nitrogen, and hydrogen;
   the carbon nanodots comprise one or more functional groups selected from amine groups, amide groups, carbonyl groups, carboxylate groups, hydroxylate groups, hydroxylamine groups, or combinations of these disposed at outer surfaces of the carbon nanodots;
   the brine solution comprises a salinity of greater than 30,000 total dissolved solids (TDS);
   a concentration of carbon nanodots in the brine solution is less than or equal to 500 parts per million by weight; and
   contacting the solid substrate with the brine solution comprising the carbon nanodots is characterized by a contact duration, a contact volume, or both, that is sufficient to reduce the oil wettability of the surface of the solid substrate by at least 15%, as defined by a contact angle of a crude oil droplet contacted with the surface of the solid substrate.

2. The method of claim 1, where contacting the surface of the solid substrate with the brine solutions comprising the carbon nanodots increases the water wettability of the surface of the solid substrate as demonstrated by a reduction in a contact angle of a crude oil droplet contacted with the surface of the solid substrate.

3. The method of claim 1, where contacting the surface of the solid substrate with the brine solution comprising the carbon nanodots reduces a contact angle of a crude oil droplet contacted with the surface of the solid substrate.

4. The method of claim 1, where the solid substrate is carbonate rock, sandstone rock, porous metals, solid metals, glass, polymeric materials, or combinations of these.

5. The method of claim 1, where the contact duration is greater than or equal to 30 minutes.

6. The method of claim 1, where the contact volume of the brine solution comprising the carbon nanodots is sufficient to contact the carbon nanodots with the surface of the solid substrate.

7. The method of claim 6, where the solid substrate is a sandstone rock or carbonate rock and the contact volume of the brine solution comprising the carbon nanodots is greater than or equal to 1 times the total pore volume of the solid substrate.

8. The method of claim 1, comprising contacting the solid substrate with the brine solution comprising the carbon nanodots at a temperature of greater than or equal to 100° C.

9. The method of claim 1, where the brine solution comprises a salinity of from greater than 30,000 Total Dissolved Solids to 240,000 Total Dissolved Solids.

10. The method of claim 1, where the concentration of carbon nanodots in the brine solution is from 10 ppm by weight to 100 ppm by weight.

11. The method of claim 1, where the carbon nanodots comprise an average particle diameter of less than 10 nanometers.

12. The method of claim 1, where the carbon nanodots are spherical.

13. The method of claim 1, where the carbon nanodots comprise an oxygen content of greater than 20 mole percent.

14. The method of claim 1, where at least 50% of the functional groups at the surface of the carbon nanodots comprise amide groups, carboxylate groups, hydroxyl groups, or combinations of these.

15. The method of claim 1, where the functional groups disposed at the outer surfaces of the carbon nanodots are chemically bonded to a matrix of the carbon nanodots.

16. The method of claim 15, where the functional groups disposed at the outer surfaces of the carbon nanodots are covalently bonded to the matrix of the carbon nanodots.

17. The method of claim 1, where the carbon nanodots have a zeta potential of greater than −10 millivolts in a solution consisting of the carbon nanodots and deionized water.

18. The method of claim 1, where the carbon nanodots are produced by the process comprising:

heating an aqueous mixture of citric acid and an alcohol amine at a temperature of from 50° C. to 100° C. to remove the majority of the water and produce a viscous solution;

heating the viscous solution at a temperature of greater than or equal to 200° C. for greater than or equal to 2 hours to produce the carbon nanodots; and collecting the carbon nanodots, wherein:

the carbon nanodots have an average particle diameter of less than 10 nm; and the carbon nanodots include the one or more amine groups, amide groups, carbonyl groups, hydroxylamine groups, or combinations of these disposed at the outer surfaces of the carbon nanodots.

19. The method of claim 18, where the amine compound comprises one or more alcohol amines, polyetheramines, or combinations of these.

20. The method of claim 18, where the amine compound comprises one or more alcohol amines selected from methanolamine, ethanolamine, propanolamine, or combinations of these.

* * * * *